(12) United States Patent
Iventosch et al.

(10) Patent No.: US 12,045,752 B2
(45) Date of Patent: Jul. 23, 2024

(54) SYSTEM FOR MANAGING CONSUMER PACKAGED GOODS

(71) Applicant: Pensa Systems, Inc., Austin, TX (US)

(72) Inventors: Joel Iventosch, Austin, TX (US); James E. Dutton, Spicewood, TX (US); Sean D. Matthews, Brooklyn, NY (US); Pinar Kaprali Gorsev, Istanbul (TR); Richard Schwartz, West Lake Hills, TX (US)

(73) Assignee: Pensa Systems, Inc., Austin, TX (US)

( * ) Notice: Subject to any disclaimer, the term of this patent is extended or adjusted under 35 U.S.C. 154(b) by 0 days.

(21) Appl. No.: 17/523,757

(22) Filed: Nov. 10, 2021

(65) Prior Publication Data

US 2022/0067424 A1    Mar. 3, 2022

Related U.S. Application Data

(62) Division of application No. 16/533,764, filed on Aug. 6, 2019, now abandoned.

(51) Int. Cl.
*G06Q 10/06* (2023.01)
*G06F 18/241* (2023.01)
(Continued)

(52) U.S. Cl.
CPC ..... *G06Q 10/06315* (2013.01); *G06F 18/241* (2023.01); *G06F 18/2431* (2023.01);
(Continued)

(58) Field of Classification Search
CPC ....................................................... G06Q 10/06
(Continued)

(56) References Cited

U.S. PATENT DOCUMENTS 10,133,933 B1 * 11/2018 Fisher .................... H04N 5/232
10,552,933 B1 *  2/2020 Calhoon .................... G06T 3/40
(Continued)

OTHER PUBLICATIONS

Chen, Wei-Yu, et al. "A Closer Look at Few-Shot Classification." ICLR, 2019, pp. 1-16.
(Continued)

*Primary Examiner* — Nga B Nguyen
(74) *Attorney, Agent, or Firm* — John A. Fortkort; Fortkort & Houston PC

(57) ABSTRACT

A system for managing consumer packaged goods (CPGs) is disclosed. The system includes a front end and a back end. The front end includes a mobile, airborne platform equipped with a digital image capturing device, and a wireless communications device. The backend is in communication with the front end via the wireless communications device, and includes a combinational convolutional neural network which derives models based on input data, a convolutional neural network which generates perception scoring utilizing input put from said combinational convolutional neural network, and a recurrent neural network which makes behavior predictions based on input from said convolutional neural network. The front end captures images of CPGs on a shelf, wherein the CPGs are subject to depletion over time, and wherein the backend generates predictions regarding the depletion state of the CPGs on the shelf as a function of time.

21 Claims, 22 Drawing Sheets

(51) Int. Cl.

| | |
|---|---|
| *G06F 18/2431* | (2023.01) |
| *G06N 3/02* | (2006.01) |
| *G06N 5/02* | (2023.01) |
| *G06Q 10/0631* | (2023.01) |
| *G06Q 10/087* | (2023.01) |
| *G06T 7/73* | (2017.01) |
| *G06T 11/20* | (2006.01) |
| *G06T 11/60* | (2006.01) |
| *G06V 10/25* | (2022.01) |
| *G06V 10/44* | (2022.01) |
| *G06V 10/764* | (2022.01) |
| *G06V 10/82* | (2022.01) |
| *G06V 20/10* | (2022.01) |

(52) U.S. Cl.
CPC ............... *G06N 3/02* (2013.01); *G06N 5/02* (2013.01); *G06Q 10/087* (2013.01); *G06T 7/73* (2017.01); *G06T 11/20* (2013.01); *G06T 11/60* (2013.01); *G06V 10/25* (2022.01); *G06V 10/454* (2022.01); *G06V 10/764* (2022.01); *G06V 10/82* (2022.01); *G06V 20/10* (2022.01); *G06V 20/176* (2022.01); *G06T 2207/20084* (2013.01); *G06T 2210/12* (2013.01)

(58) Field of Classification Search
USPC ........................................................ 705/7.31
See application file for complete search history.

(56) References Cited

U.S. PATENT DOCUMENTS

| 10,748,072 | B1* | 8/2020 | Seeger | G06N 7/005 |
|---|---|---|---|---|
| 10,885,395 | B2 | 1/2021 | Iventosch et al. | |
| 2018/0181913 | A1* | 6/2018 | Higa | G06Q 10/0875 |
| 2018/0204111 | A1* | 7/2018 | Zadeh | G06N 3/0436 |
| 2019/0043003 | A1* | 2/2019 | Fisher | G06V 10/82 |
| 2019/0073627 | A1* | 3/2019 | Nakdimon | G06Q 10/087 |

OTHER PUBLICATIONS

Xu, Jiaming, et al. "Convolutional Neural Networks for Text Hashing." Proceedings of the 24th International Joint Conference on Artificial Intelligence, 2015, pp. 1369-1375.

Lai, Hanjiang, et al. "Simultaneous Feature Learning and Hash Coding with Deep Neural Networks." 2015 IEEE Conference on Computer Vision and Pattern Recognition (CVPR), Apr. 14, 2015, pp. 3270-3278., doi:10.1109/cvpr.2015.7298947.

Cao, Yue, et al. "Correlation Hashing Network for Efficient Cross-Modal Retrieval." Procedings of the British Machine Vision Conference 2017, Feb. 20, 2017, doi:10.5244/c.31.128.

Xian, Yongqin, et al. "Zero-Shot Learning—A Comprehensive Evaluation of the Good, the Bad and the Ugly." IEEE Transactions on Pattern Analysis and Machine Intelligence, vol. 41, No. 9, Jan. 2019, pp. 2251-2265., doi:10.1109/tpami.2018.2857768.

Wang, Xiaolong, et al. "Zero-Shot Recognition via Semantic Embeddings and Knowledge Graphs." 2018 IEEE/CVF Conference on Computer Vision and Pattern Recognition, Apr. 8, 2018, doi:10.1109/cvpr.2018.00717.

Zhu, Pengkai, et al. "Generalized Zero-Shot Recognition Based on Visually Semantic Embedding." 2019 IEEE/CVF Conference on Computer Vision and Pattern Recognition (CVPR), Apr. 9, 2019, doi: 10.1109/cvpr.2019.00311.

Schonfeld, Edgar, et al. "Generalized Zero- and Few-Shot Learning via Aligned Variational Autoencoders." 2019 IEEE/CVF Conference on Computer Vision and Pattern Recognition (CVPR), Apr. 5, 2019, doi:10.1109/cvpr.2019.00844.

Atzmon, Yuval, and Gal Chechik. "Adaptive Confidence Smoothing for Generalized Zero-Shot Learning." 2019 IEEE/CVF Conference on Computer Vision and Pattern Recognition (CVPR), May 13, 2019, doi:10.1109/cvpr.2019.01194.

Zhao, An, et al. "Domain-Invariant Projection Learning for Zero-Shot Recognition." Proceedings of the 32nd Conference on Neural Information Processing Systems (NeurIPS), 2018.

Liu, Shichen, et al. "Generalized Zero-Shot Learning with Deep Calibration Network." Proceedings of the 32nd Conference on Neural Information Processing Systems (NeurIPS), 2018.

Yu, Yunlong, et al. "Stacked Semantics-Guided Attention Model for Fine-Grained Zero-Shot Learning." Proceedings of the 32nd Conference on Neural Information Processing Systems (NeurIPS), 2018.

Guo, Yuchen, et al. "Zero-Shot Recognition via Direct Classifier Learning with Transferred Samples and Pseudo Labels." Proceedings of the Thirty-First AAAI Conference on Artificial Intelligence (AAAI-17), 2017.

Wang, Wenlin, et al. "Zero-Shot Learning via Class-Conditioned Deep Generative Models." Proceedings of the Thirty-Second AAAI Conference on Artificial Intelligence (AAAI-18), 2018.

Cao, Yue et al. "Collective Deep Quantization for Efficient Cross-Modal Retrieval." Proceedings of the Thirty-First AAAI Conference on Artificial Intelligence (AAAI-17), 2017.

Jiang, Qing-Yuan, and Wu-Jun Li. "Deep Cross-Modal Hashing." 2017 IEEE Conference on Computer Vision and Pattern Recognition (CVPR), 2017, doi:10.1109/cvpr.2017.348.

Chen, Binghui, and Weihong Deng. "Hybrid-Attention Based Decoupled Metric Learning for Zero-Shot Image Retrieval." 2019 IEEE/CVF Conference on Computer Vision and Pattern Recognition (CVPR), 2019, doi:10.1109/cvpr.2019.00286.

Lin, Kevin, et al. "Deep Learning of Binary Hash Codes for Fast Image Retrieval." 2015 IEEE Conference on Computer Vision and Pattern Recognition Workshops (CVPRW), 2015, doi:10.1109/cvprw.2015.7301269.

Cao, Yue, et al. "Deep Cauchy Hashing for Hamming Space Retrieval." 2018 IEEE/CVF Conference on Computer Vision and Pattern Recognition, 2018, doi:10.1109/cvpr.2018.00134.

Zhu, Han et al. "Deep Hashing Network for Efficient Similarity Retrieval." Proceedings of the Thirtieth AAAI Conference on Artificial Intelligence (AAAI-16), 2016.

Cao, Yue, et al. "Deep Quantization Network for Efficient Image Retrieval." Proceedings of the Thirtieth AAAI Conference on Artificial Intelligence (AAAI-16), 2016.

Cao, Yue, et al. "Deep Visual-Semantic Quantization for Efficient Image Retrieval." 2017 IEEE Conference on Computer Vision and Pattern Recognition (CVPR), 2017, doi:10.1109/cvpr.2017.104.

Cao, Zhangjie, et al. "HashNet: Deep Learning to Hash by Continuation." 2017 IEEE International Conference on Computer Vision (ICCV), 2017, doi:10.1109/iccv.2017.598.

Jiang, Huajie, et al. "Learning Class Prototypes via Structure Alignment for Zero-Shot Recognition." Computer Vision—ECCV 2018 Lecture Notes in Computer Science, 2018, pp. 121-138., doi:10.1007/978-3-030-01249-6_8.

Li, Wu-Jun, Sheng Wang, and Wang-Cheng Kang. "Feature learning based deep supervised hashing with pairwise labels." 2015, doi:arXiv:1511.03855.

Song, Jie, et al. "Selective Zero-Shot Classification with Augmented Attributes." Computer Vision—ECCV 2018 Lecture Notes in Computer Science, 2018, pp. 474-490., doi:10.1007/978-3-030-01240-3_29.

Lee, Chung-Wei, et al. "Multi-Label Zero-Shot Learning with Structured Knowledge Graphs." 2018 IEEE/CVF Conference on Computer Vision and Pattern Recognition, 2018, doi:10.1109/cvpr.2018.00170.

Niu, Li, et al. "Webly Supervised Learning Meets Zero-Shot Learning: A Hybrid Approach for Fine-Grained Classification." 2018 IEEE/CVF Conference on Computer Vision and Pattern Recognition, 2018, doi:10.1109/cvpr.2018.00749.

"One-Shot Learning." Wikipedia, Wikimedia Foundation, Mar. 27, 2020, en.wikipedia.org/wiki/One-shot_learning.

Felix, Rafael, et al. "Multi-Modal Cycle-Consistent Generalized Zero-Shot Learning." Computer Vision—ECCV 2018 Lecture Notes in Computer Science, 2018, pp. 21-37., doi:10.1007/978-3-030-01231-1_2.

(56) References Cited

OTHER PUBLICATIONS

Cao, Yue, et al. "Deep Visual-Semantic Hashing for Cross-Modal Retrieval." Proceedings of the 22nd ACM SIGKDD International Conference on Knowledge Discovery and Data Mining—KDD 16, 2016, doi:10.1145/2939672.2939812.

Verma, Vinay Kumar, et al. "Generalized Zero-Shot Learning via Synthesized Examples." 2018 IEEE/CVF Conference on Computer Vision and Pattern Recognition, 2018, doi:10.1109/cvpr.2018.00450.

Sinha, Smita. "What is Zero-Shot Learning?" Analytics India Magazine, Jun. 18, 2018, analyticsindiamag.com/what-is-zero-shot-learning/.

Xian, Yongqin, et al. "Feature Generating Networks for Zero-Shot Learning." 2018 IEEE/CVF Conference on Computer Vision and Pattern Recognition, 2018, doi:10.1109/cvpr.2018.00581.

Zhao, Fang, et al. "Deep Semantic Ranking Based Hashing for Multi-Label Image Retrieval." 2015 IEEE Conference on Computer Vision and Pattern Recognition (CVPR), 2015, doi:10.1109/cvpr.2015.7298763.

* cited by examiner

FIG. 7

SYSTEM FOR MANAGING CONSUMER PACKAGED GOODS

CROSS-REFERENCE TO RELATED APPLICATIONS

This application is a divisional of U.S. Ser. No. 16/533,764, entitled "RECOGNITION AND PREDICTION OF SEMANTIC EVENTS LEARNED THROUGH REPEATED OBSERVATION", which was filed on Aug. 6, 2019, which has the same inventors, and which is incorporated herein by reference in its entirety; which claims the benefit of U.S. Provisional Application No. 62/715,168, filed Aug. 6, 2018, having the same title and the same inventorship, and which is incorporated herein by reference in its entirety.

FIELD OF THE DISCLOSURE

The present application relates generally to object recognition from images, and more specifically to systems and methodologies for the recognition and prediction of semantic events learned through repeated observation of Consumer Packaged Goods (CPGs).

BACKGROUND OF THE DISCLOSURE

Merchandise that consumers use up and replace on a frequent basis are known in the industry as Consumer Packaged Goods (CPGs). Brick and mortar establishments that buy and sell such merchandise are an important part of the economy. These establishments typically employ sophisticated automation systems to track what comes in (supply chain management systems) and what goes out (point of sale systems), but often have little visibility into what happens to the products in between.

Recent advances in artificial intelligence make it feasible to survey, count, and track the movement of inventory during this period in a completely automated and objective way. One key component of this technology is the use of artificial neural networks to recognize objects from camera images. In particular, the advent of deep convolutional neural networks (CNNs) as a mechanism for recognizing individual objects within an image or image stream (video) has revolutionized the field. See, for example, A. Krizhevsky, I. Sutskever, and G. E. Hinton, "Imagenet classification with deep convolutional neural networks", *Advances in Neural Information Processing Systems*, pages 1097-1105 (2012).

In the past five years, refinements to CNNs, such as augmenting a CNN with a Region Proposal Network (R-CNN), have made it possible to recognize and distinguish dozens, and even hundreds, of different object categories. See Shaoqing Ren, Kaiming He, Ross Girshick, Jian Sun, "Faster R-CNN: Towards Real-Time Object Detection and Region Proposal Networks" (2016), available online at https://arxiv.org. A yearly industry-wide contest known as "The ImageNet Large Scale Visual Recognition Challenge" (described online at http://image-net.org) is designed to push the limits of automatic object recognition and localization. At present, this contest challenges researchers worldwide to design systems that can recognize up to 1,000 distinct object classes.

BRIEF DESCRIPTION OF THE DRAWINGS

FIG. 2 is an illustration of some inventory situations that the systems and methodologies disclosed herein may be applied to.

FIG. 7 is a screenshot from a software program used in the back-end of a system of the type disclosed herein which illustrates the application of cognitive reasoning in the systems and methodologies disclosed herein.

SUMMARY OF THE DISCLOSURE

Figure 1:
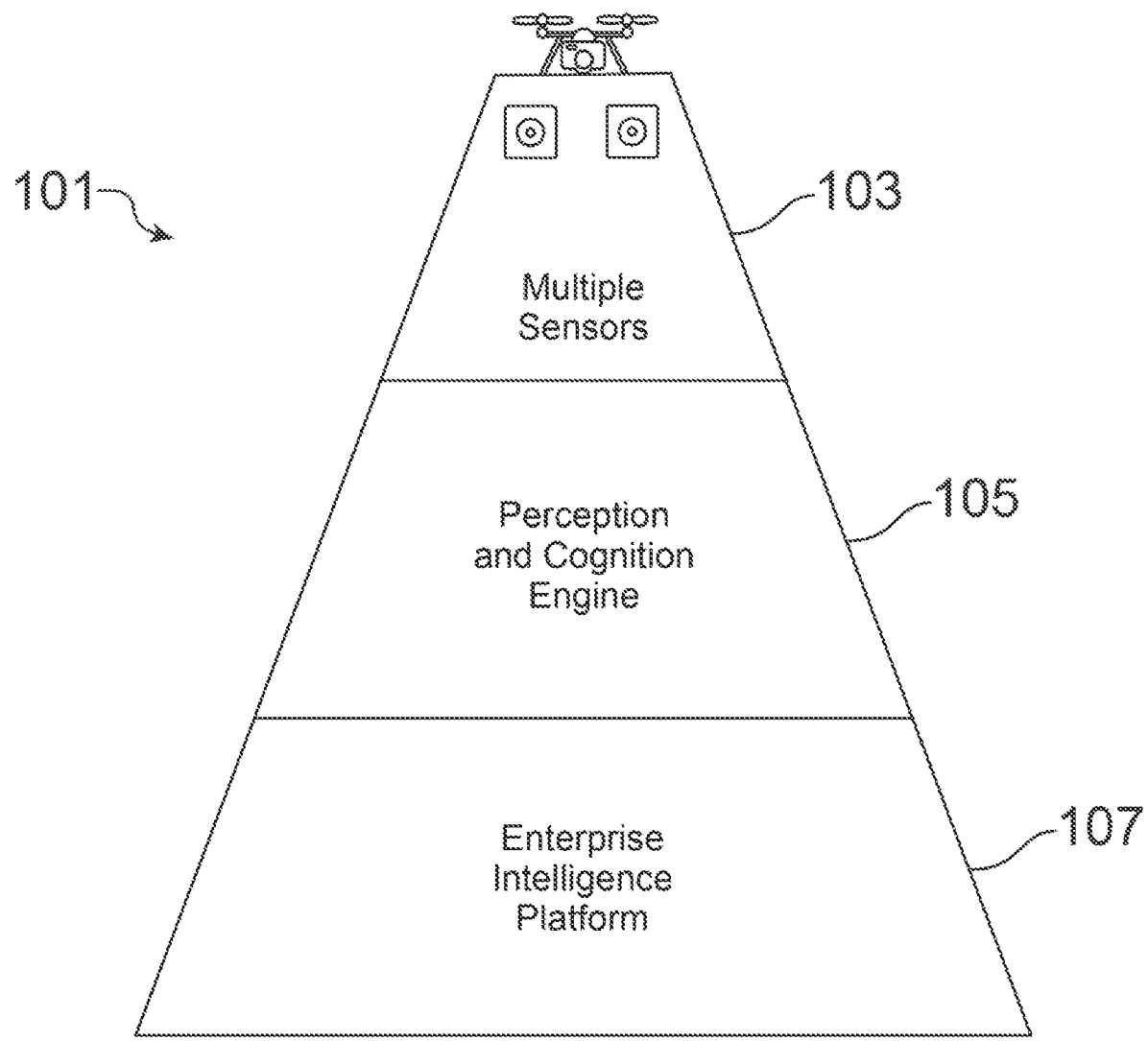
FIG. 1 is an illustration of the autonomous machine perception as implemented in preferred embodiments of the systems and methodologies disclosed herein.

In one aspect, a system for managing consumer packaged goods (CPGs) is provided which comprises a front end which includes a mobile, airborne platform equipped with (i) a digital image capturing device, and (ii) a wireless communications device; and a backend, in communication with said front end via said wireless communications device, said back end including (a) a combinational convolutional neural network which derives models based on input data, (b) a convolutional neural network which generates perception scoring utilizing input put from said combinational convolutional neural network, and (c) a recurrent neural network which makes behavior predictions based on input from said convolutional neural network; wherein said front end captures images of CPGs on a shelf, wherein the CPGs are subject to depletion over time, and wherein the backend generates predictions regarding the depletion state of the CPGs on the shelf as a function of time.

In another aspect, a method is provided for managing an inventory of consumer packaged goods (CPGs). The method comprises (A) using a convolutional neural network, in conjunction with object recognition of CPGs and physical inventory localization, to generate a plurality of derived inventory maps of CPGs over a corresponding plurality of points of time; (B) using a first recurrent neural network (RNN) to generate an imputed planogram by performing time series analysis on the plurality of derived inventory maps; (C) using a convolutional neural network (CNN) to derive a fullness of stock score for the inventory of CPGs relative to the imputed planogram; (D) using the fullness of stock score, in conjunction with the imputed planogram, to obtain a current state anomaly classification; repeating steps A-D n times, wherein n>1; using a second recurrent neural network (RNN) to perform time series analysis on changes to current state anomalies as a function of time, thereby obtaining time series analysis results; and using the time series analysis results to predict at least one future state anomaly classification.

In a further aspect, a method is provided for managing an inventory of consumer packaged goods (CPGs). The method comprises obtaining object recognition data by (a) identifying a set of objects as being a set of CPGs by applying a first level of object recognition to the set of objects, (b) performing a second level of object recognition on each of the objects, (c) assigning each of the objects to one of a plurality of predefined superclasses, based on the results of the second level of object recognition, (d) obtaining cropped images of each of the objects, (e) performing a third level of object recognition on the cropped images, and (f) assigning each object to one of a plurality of predefined subclasses, based on the results of the third level of object recognition; (B) using a convolutional neural network, in conjunction with the object recognition data and physical inventory localization, to generate a plurality of derived inventory maps of CPGs over a corresponding plurality of points of time; (C) using a first recurrent neural network (RNN) to generate an imputed planogram by performing time series analysis on the plurality of derived inventory maps; (D) using a convolutional neural network (CNN) to derive a fullness of stock score for the inventory of CPGs relative to the imputed planogram; (E) using the fullness of stock score, in conjunction with the imputed planogram, to obtain a current state anomaly classification; repeating steps B-E n times, wherein n>1; using a second recurrent neural network (RNN) to perform time series analysis on changes to current state anomalies as a function of time, thereby obtaining time series analysis results; and using the time series analysis results to predict at least one future state anomaly classification.

DETAILED DESCRIPTION

The second problem with current approaches, at least when applied to CPG recognition, is the shear number of categories that must be distinguished. Thus, for example, a typical grocery store might display up to 50,000 different SKUs, and superstores may contain up to twice that number. The number of SKUs present in these environments are two orders of magnitude greater than the current state of the art for automated object recognizers.

Academic efforts to go from hundreds to thousands of recognized categories include attempts to decouple the task of object detection (which may involve automatically drawing a bounding box around an object of interest) and object classification (which may involve determining the most likely category of the object within the bounding box). By contrast, conventional approaches often perform both those tasks simultaneously in order to improve recognition speed at the expense of scalability.

One approach to scaling object recognition is to derive a few (less than 100) abstract superclasses of objects, and then use those superclasses to aid in object detection. The superclasses may be derived, for example, by clustering deep semantic features of thousands of training images. See, for example, Bharat Singh, Hengduo Li, Abhishek Sharma, Larry S. Davis, "R-FCN-3000 at 30 fps: Decoupling Detection and Classification" (2017), which may be found online at www.cs.umd.edu. After an object has been detected, the image may be cropped and passed to a fine-grained object classifier. One very interesting result of this work is that, even if the number of derived superclasses is reduced to just one, the overall detection and recognition accuracies for untrained images are still quite good, even at scale. In other words, generic "objectness" seems to be a robust and stable trait, at least among the images in the ImageNet data set.

Applying this decoupled approach to in situ images of CPGs, however, does not yield similarly promising results. The problem is that CPGs in those images, unlike objects in ImageNet images, are not sparse, isolated, and surrounded by background. Instead, they tend to be densely-packed, numerous, and surrounded mostly by other CPGs.

The failure of the foregoing methodologies has contributed to the current status quo—an $8 trillion market which is under siege as online and offline channels merge. Currently utilized systems of shelf inventory tracking are labor intensive (these systems frequently rely on human observers to walk the isles of a brick-and-mortar establishment and make observations with respect to the current state of inventory items) and yield inconsistent results. Thus, for example, in a typical retail setting, nearly 1 in 10 items is missing or misplaced. This results in lost revenues, dissatisfied customers and excess inventory, and adversely affects retailers and their brands. To date, attempts to automate shelf inventory tracking (as through the use, for example, of RFID tags, ground robots, and Amazon's Go smart shelves), have proven to be capital intensive, non-scalable, and brittle, and have failed to adequately address the foregoing problems.

There thus exists a need in the art for a scalable system and methodology for continuously monitoring, analyzing and optimizing shelf inventory and availability. There is further a need for such a system and methodology which may be applied to CPGs. These and other needs may be addressed with the systems and methodologies disclosed herein.

A system and methodology for image recognition of Consumer Packaged Goods (CPGs), and a method for scaling the same, have previously been described in commonly assigned U.S. Ser. No. 16/443,790 (Iventosch et al.), entitled "METHOD FOR SCALING FINE-GRAINED OBJECT RECOGNITION OF CONSUMER PACKAGED GOODS", which was filed on Jun. 17, 2019, and which is incorporated herein by reference in its entirety. The scalable solution disclosed herein for continuously monitoring and optimizing shelf inventory and availability provides a cognitive layer over the systems and methodologies of the '790 application so that, after those systems and methodologies have served up suitable object recognition data for CPGs, the cognitive layer operates on the object recognition data by applying suitable perception and reasoning to yield actionable results. These results may then be utilized by management to make intelligent business decisions with respect, for example, to the restocking timing, frequency and volume of CPGs, to inform or modify the replenishment cycle for CPGs, and to identify misplaced goods. These results may also be utilized in conjunction with suitable planograms to determine the optimal placement and space allocation for CPGs. The scalable solutions disclosed herein may thus be utilized to improve inventory visibility and to facilitate inventory auditing.

As previously noted, conventional inventory management relies on the use of human observers to walk the isles of a brick-and-mortar establishment and make observations with respect to the current state of inventory items. This process is subject to human error, and relies on the experience of the observer to recognize when the state of items on a shelf have deviated from what they should be. By contrast, in a preferred embodiment, the systems and methodologies disclosed herein are implemented through the use of small, lightweight imaging devices (such as drones equipped with digital cameras) that are capable of hovering and automatically scanning the shelves within an establishment. Such an establishment may be a brick-and-mortar retailer, the backroom or staging area for such a retailer, or a facility in a different part of the CPG supply chain (such as, for example, a fulfillment center for picking and packing items for ecommerce).

These imaging devices are preferably configured to avoid people. Thus, in the preferred embodiment, the imaging device is configured to park in an out-of-the-way location (such as, for example, in a platform or space at the top of a shelving unit), and to move into areas between shelving units only when these areas are unoccupied. The imaging device is also preferably configured to perform dynamic scans as frequently as once an hour (which yields a 200× improvement over some existing inventory management systems). These systems and methodologies may be provided as business solutions that may be readily implemented by brick-and-mortar stores. In particular, these business solutions may be implemented in a manner that requires little or no integration or capital expenditures, is managed by an appropriate business entity as a service, and is readily scalable (for example, it may be readily expanded from one category to a full store with a syndicated business model).

FIG. 1 illustrates the basic structure of a particular, non-limiting embodiment of a system of the type disclosed herein. The system 101 depicted therein includes a front end which is equipped with multiple sensors 103 that provide observational data to the system. These sensors 103 are preferably implemented in a hovercraft such as an indoor drone. A cloud-based back end is equipped with a perception and cognition engine 105 that implements the artificial intelligence of the system. An enterprise intelligence platform 107 is provided to enable management to make intelligent business decisions based on system predictions with respect, for example, to the stocking of CPGs.

The system 101 depicted in FIG. 1 operates to bring physical inventory online by leveraging artificial intelligence to see and interpret the physical world, and in particular, the state of CPGs on a shelf. The system functions to index the observed world, much like Google indexes the cyber world. In so doing, the system replaces human eyes with computer vision and machine cognition to improve visual inspection and audit of CPG inventory.

Figure 2:
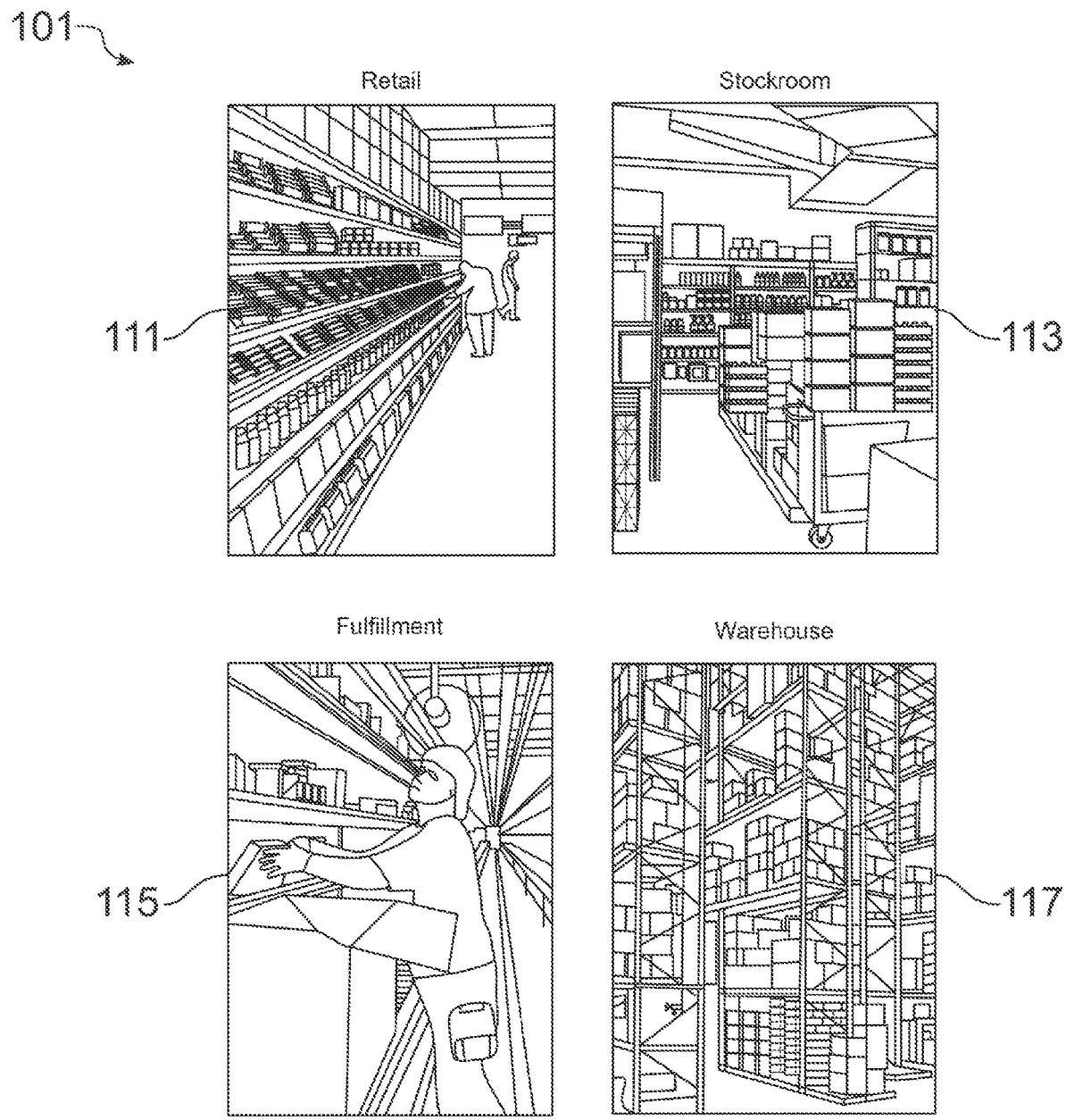

FIG. 2 depicts some particular, non-limiting examples of inventory applications that the systems and methodologies disclosed herein may be applied to. These include, without limitation, retail settings 111 (such as, for example, grocery stores, convenience stores, hardware stores, or pharmacies), stockrooms 113, fulfillment centers 115, and warehouses 117. These applications represent what is currently an $8 trillion global market. In such settings, it is commonly found that nearly 1 in 10 items is missing or misplaced, which leads to significant lost revenues, customer dissatisfaction and excess inventory. Both retailers and brands suffer as a result.

Figure 3:
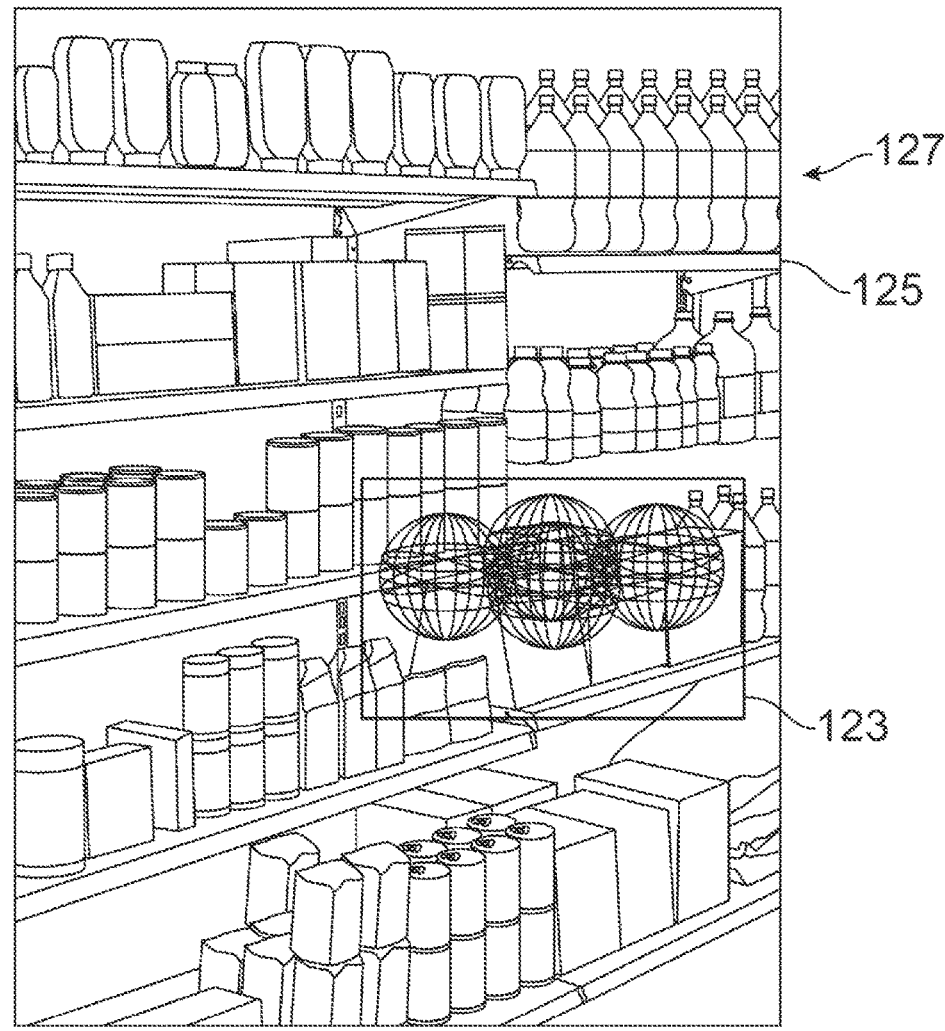
FIG. 3 is an illustration of a drone-based front-end for an embodiment of a system of the type disclosed herein.
Figure 4:
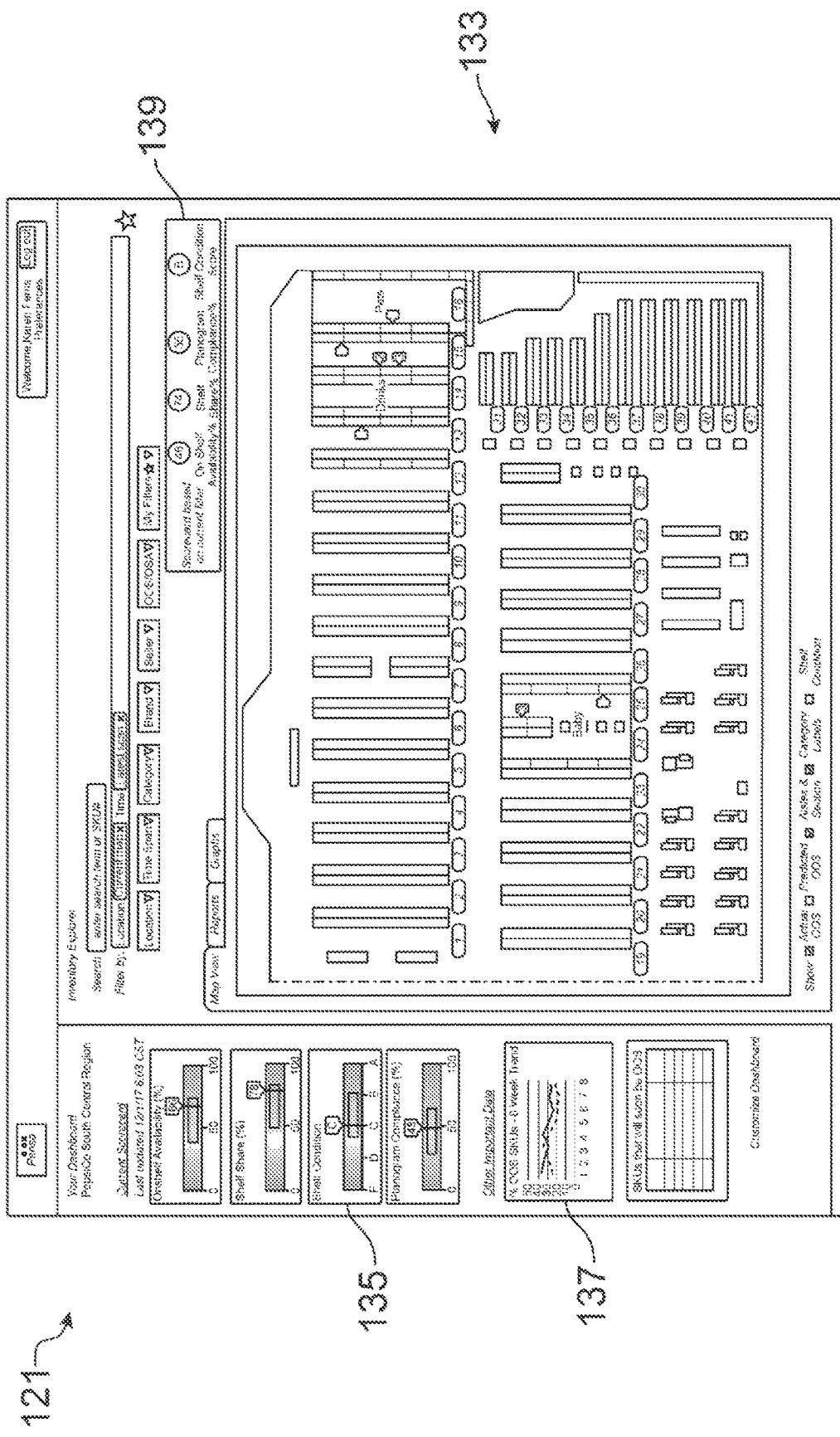
FIG. 4 is a screenshot from an embodiment of a software program used in the back-end of a system of the type disclosed herein.

FIGS. 3 and 4 depict, respectively, particular, non-limiting embodiments of the front 121 and back ends 131 of a system of the type disclosed herein for monitoring and optimizing shelf inventory and availability. As previously noted, the front end 121 (depicted in FIG. 3) is preferably implemented as a small, light-weight hovercraft 123. The hovercraft 123 is equipped with suitable sensors and one or more imaging devices, thus allowing it to automatically scan shelves 125 to ascertain the current state of CPGs 127 thereon. The hovercraft 123 is preferably adapted to operate in a non-invasive manner in which it actively avoids people. Preferably, the hovercraft 123 is programmed to park in an out-of-the-way location, such as high on a shelf, and to enter an area for scanning only when that area is devoid of people. The hovercraft 123 may operate in this manner to perform scans at any desired interval, although once an hour is found to be sufficient for many applications. It communicates with the backend 131 via the cloud, and typically via a local area network (based, for example, on Bluetooth, radio frequency or cellular communications) which is in communication with the cloud.

A particular, non-limiting embodiment of the backend 131 is depicted in FIG. 4. The backend 131 is essentially a software package with a graphical user interface (GUI) 133 which runs on a suitable computational device at the bricks and mortar establishment, although embodiments are also possible in which the backend is remotely located and in communication with the front end through a suitable communications network. The backend 131 applies artificial intelligence to the data received from the front end 121 (see FIG. 3) and displays the results via the GUI 133. As seen in FIG. 4, this GUI 133 may include various dashboards 135, graphs 137 and graphical objects 139 which allow a user to readily grasp inventory information. Such inventory information may include, for example, the current state of inventory items, the depletion rate of those items, and the predicted depletion date.

Preferred embodiments of the foregoing system utilize a drone for image capture purposes (though in some applications, robots or other imaging systems or platforms may be utilized instead of, or in conjunction with, drones). The use of drones provides the ability to image stock with greater frequency. Thus, for example, in some implementations, the use of drones may allow the autonomous capture of more than 100 distinct perspectives of CPGs on a shelf. The associated increase in data points and sampling frequencies allows the system to better infer what the shelves are being managed to, how much replenishment is occurring, when CPGs are refaced, the velocity with which CPGs leave the shelfs, and other useful metrics. Consequently, improvements may be achieved in the accuracy with which the state and location of inventory items is ascertained. Moreover, the resulting system may provide essentially continuous inventory visibility. Finally, the resulting system may also provide improved inventory state prediction. Thus, for example, a user may be able to predict that, unless corrective action is taken, one or more CPGs will be depleted within a given unit of time.

As explained below, preferred embodiments of the systems and methodologies disclosed herein are equipped with a cognitive layer with a learning and feedback loop. Preferably, this will involve sending the drone or other imaging platform out, recognizing CPGs and their location on a shelf (using the convolutional neural network described herein), and doing perception scoring (that is, determining the state of depletion of the inventory, or how "picked back" it is). The cognitive layer then allows for behavior prediction. For example, after the perception scoring test has been completed several times, it becomes possible to predict, using the recurrent neural network described below, what the depletion state of CPGs will be at a future point in time. These results may be used to further tune the model, which may become better at predicting future states as more iterations of the overall process are completed. Hence, preferred embodiments of the systems and methodologies disclosed herein implement task-based artificial intelligence (AI) model derivation cycles from repeated exposure to the same (or similar) informational patterns. In these cycles, the model changes over time as, for example, it becomes more finely tuned or adapts to changes in inventory.

Figure 5:
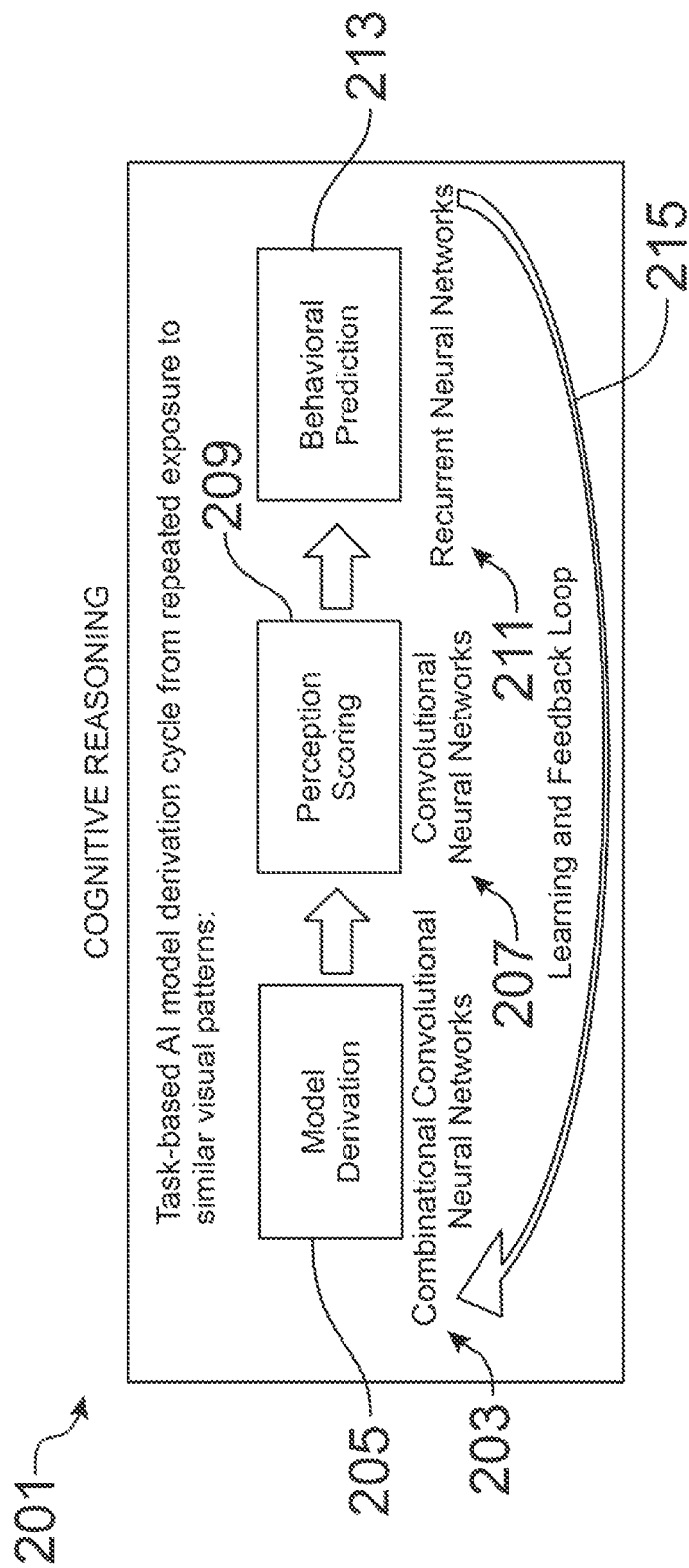
FIG. 5 is an illustration of the cognitive reasoning utilized in a preferred embodiment of the systems and methodologies disclosed herein.

FIG. 5 illustrates a particular, non-limiting embodiment of a system which implements the task-based AI model derivation cycle utilized herein. The cycle operates to generate models based on repeated exposure to similar data patterns, such as those arising from imaging CPGs on a shelf. In essence, the system 201 utilizes combinational convolutional neural networks 203 to derive a model 205 for the state of inventory. Convolutional neural networks 207 are then utilized to apply perception scoring 209 to the model 205, after which recurrent neural networks 211 are utilized to make behavior predictions 213 (such as, for example, the date on which depletion of inventory items will occur). A learning and feedback loop 215 passes the results back to the combinational convolutional neural networks 207, where that data is utilized to refine the model 205 in the next iteration of the process.

Figure 17:
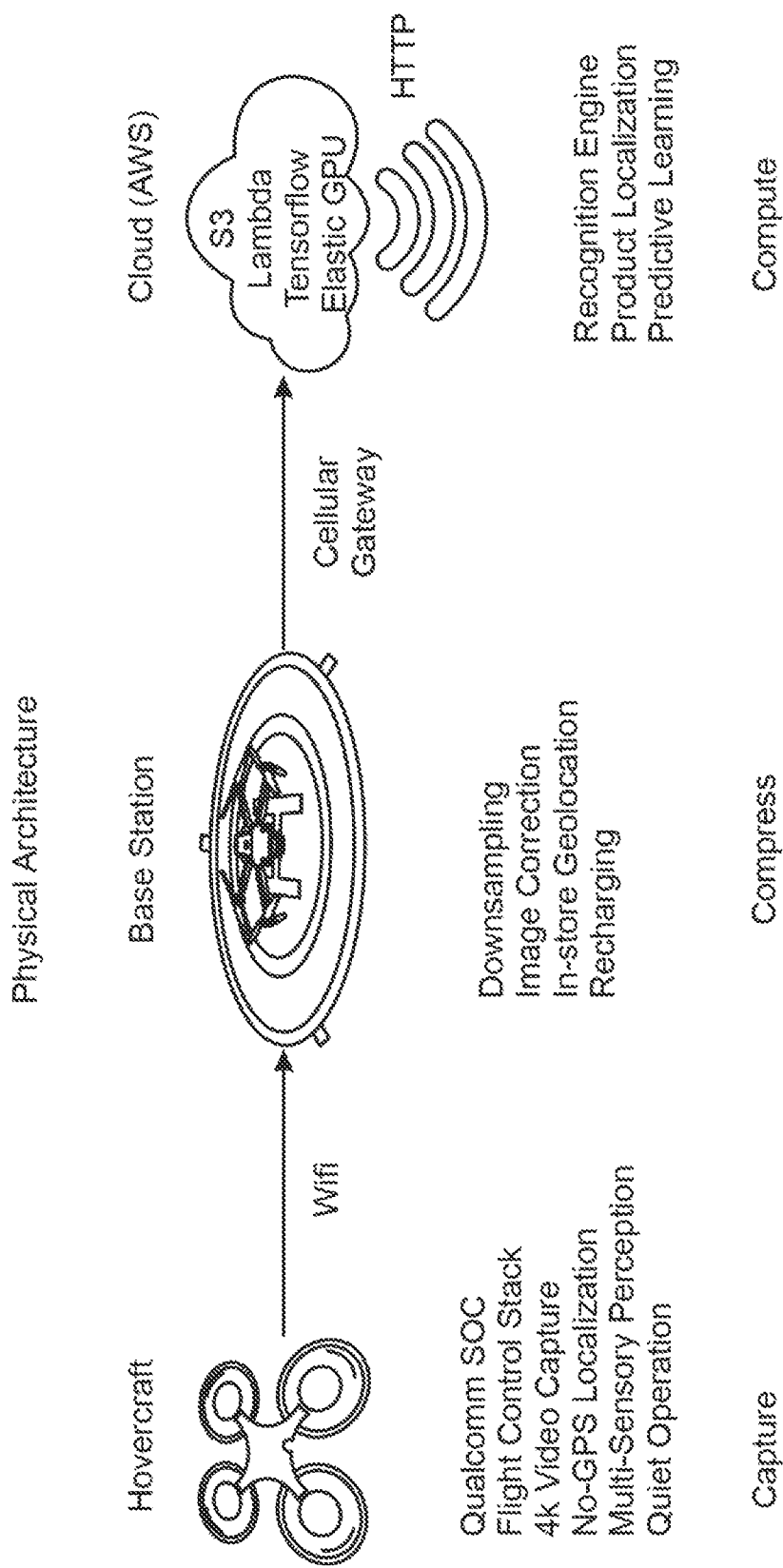
FIG. 17 is an illustration of a physical architecture for a preferred embodiment of a system disclosed herein.

The physical architecture 401 of a preferred embodiment of the foregoing system may be appreciated with respect to the particular, non-limiting embodiment thereof depicted in FIG. 17. It will be appreciated that, although these components or functionalities are depicted as distinct modules or elements for purposes of illustration, in some embodiments of the systems and methodologies disclosed herein, these modules or their components or functionalities may be combined in various ways.

As seen in FIG. 17, the front end 403 of the system includes a hovercraft 405 which serves a data capture function. The hovercraft 405 is preferably a drone which, in one specific, non-limiting embodiment, is equipped with a Qualcomm SOC (system on a chip), a flight control stack which controls the operation of the hovercraft, a camera with (preferably 4 k) video capture capability, indoor positioning or location awareness functionalities, and multi-sensory perception. The hovercraft 405 is preferably adopted for quiet operation.

The hovercraft 405 is preferably equipped with a base station 411. The base station 411 is preferably in communication with the hovercraft via a suitable wireless communications protocol 412 (such as, for example, Wi-Fi or Bluetooth) and provides data compression functionalities for the data captured by the hovercraft 403. The base station 405 may also provide various other functionalities including, for example, down-sampling, image correction, in-store geolocation, and recharging of the hovercraft. Recharging may be accomplished through contact charging, induction charging, or other suitable means as are known to the art.

Suitable cloud compute resources 407 are provided to handle the backend data manipulation for the system. The cloud compute resources 407 are preferably in communication with the base station 405 via a cellular gateway 414 operating a suitable protocol such as the hypertext transfer protocol (HTTP). The cloud compute resources 407 may include, for example, resources for pattern recognition, product localization and predictive learning.

Figure 22:
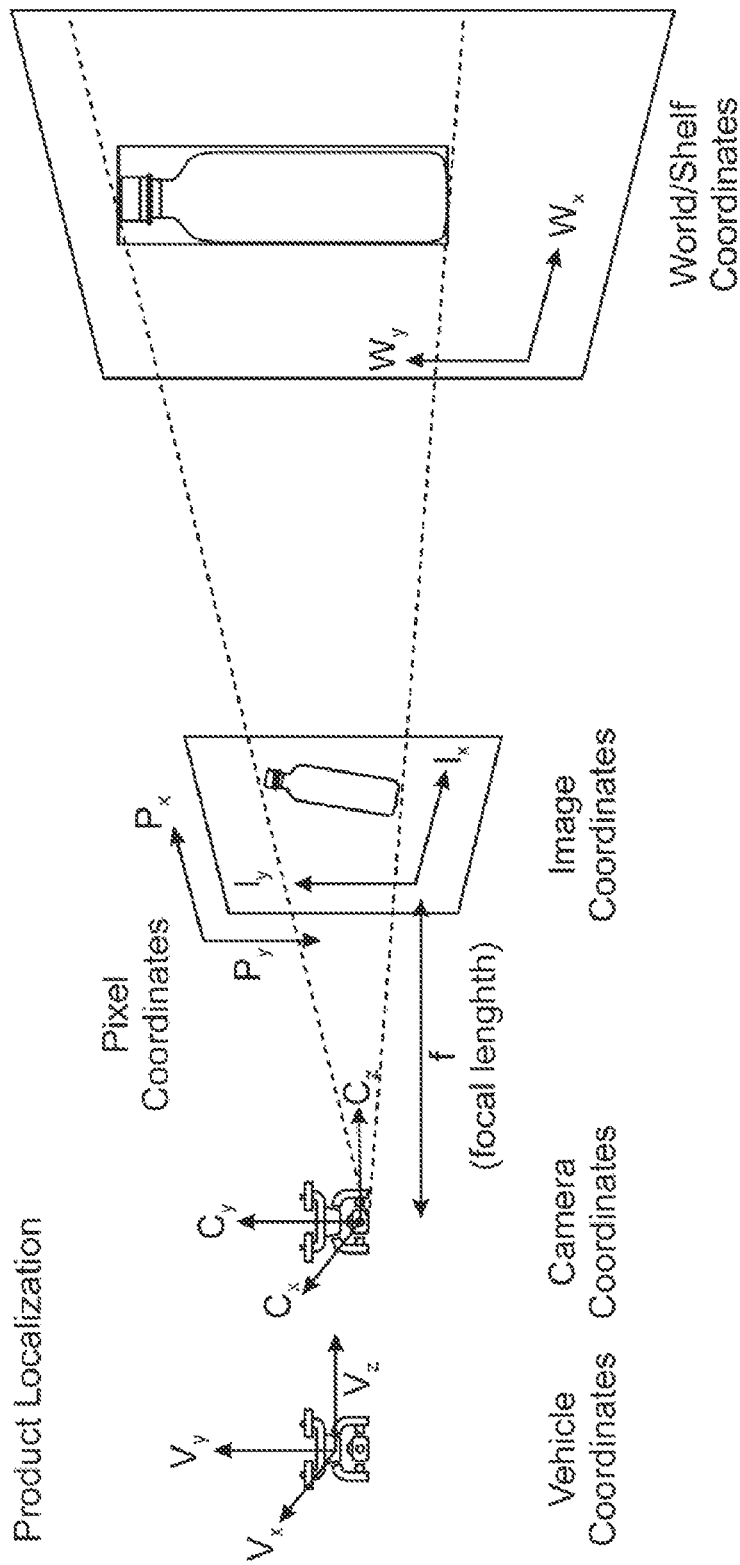
FIG. 22 depicts the manner by which product localization occurs in a preferred embodiment of the systems and methodologies disclosed herein.

The operation of the product localization resource may be appreciated with respect to FIG. 22. As seen therein, the vehicle coordinates 703 (that is, the coordinates of the drone or other image capture platform at the time image capture occurs) differ from the camera coordinates 705, which also differ from the image coordinates 707. The foregoing coordinates must be suitably manipulated to map them to the real world or shelf coordinates 709 of a product. This mapping is implemented by the product localization resource.

Figure 18:
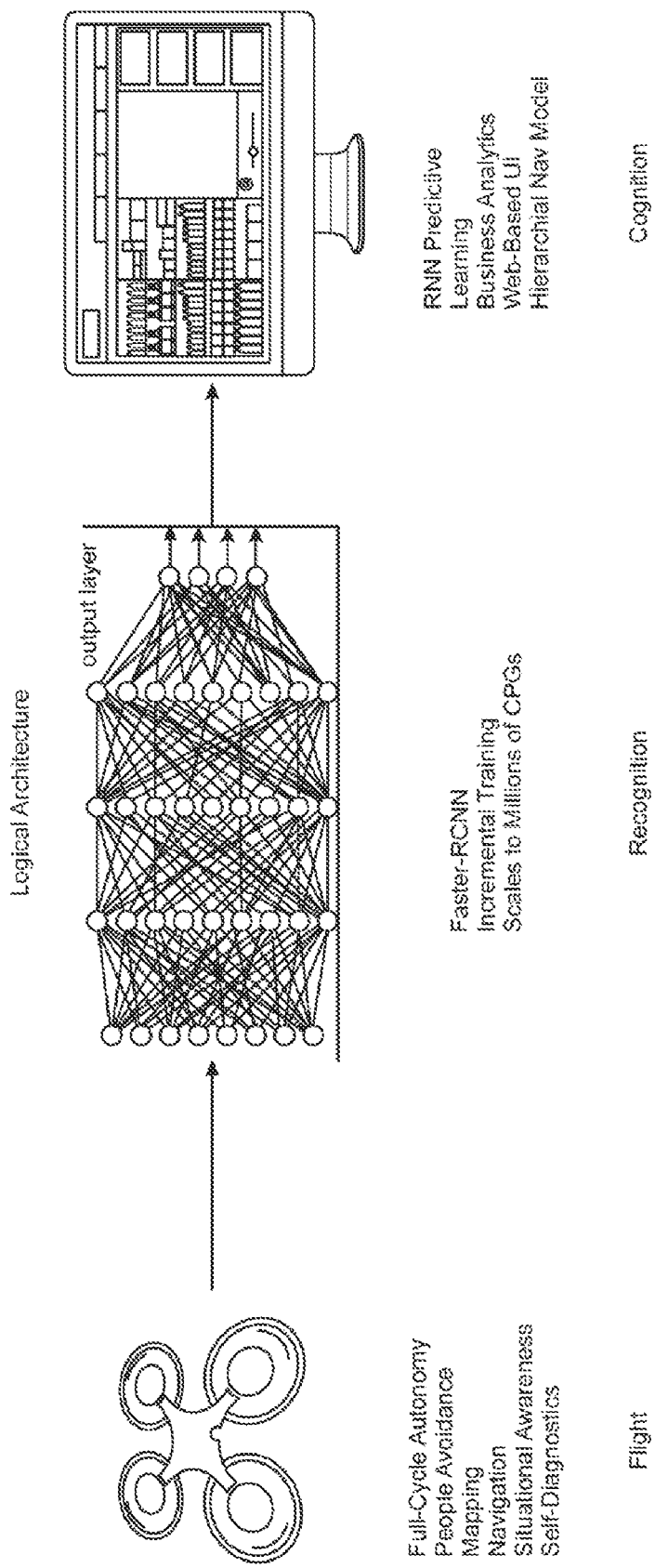
FIG. 18 is an illustration of a logical architecture for a preferred embodiment of a system disclosed herein.
Figure 19:
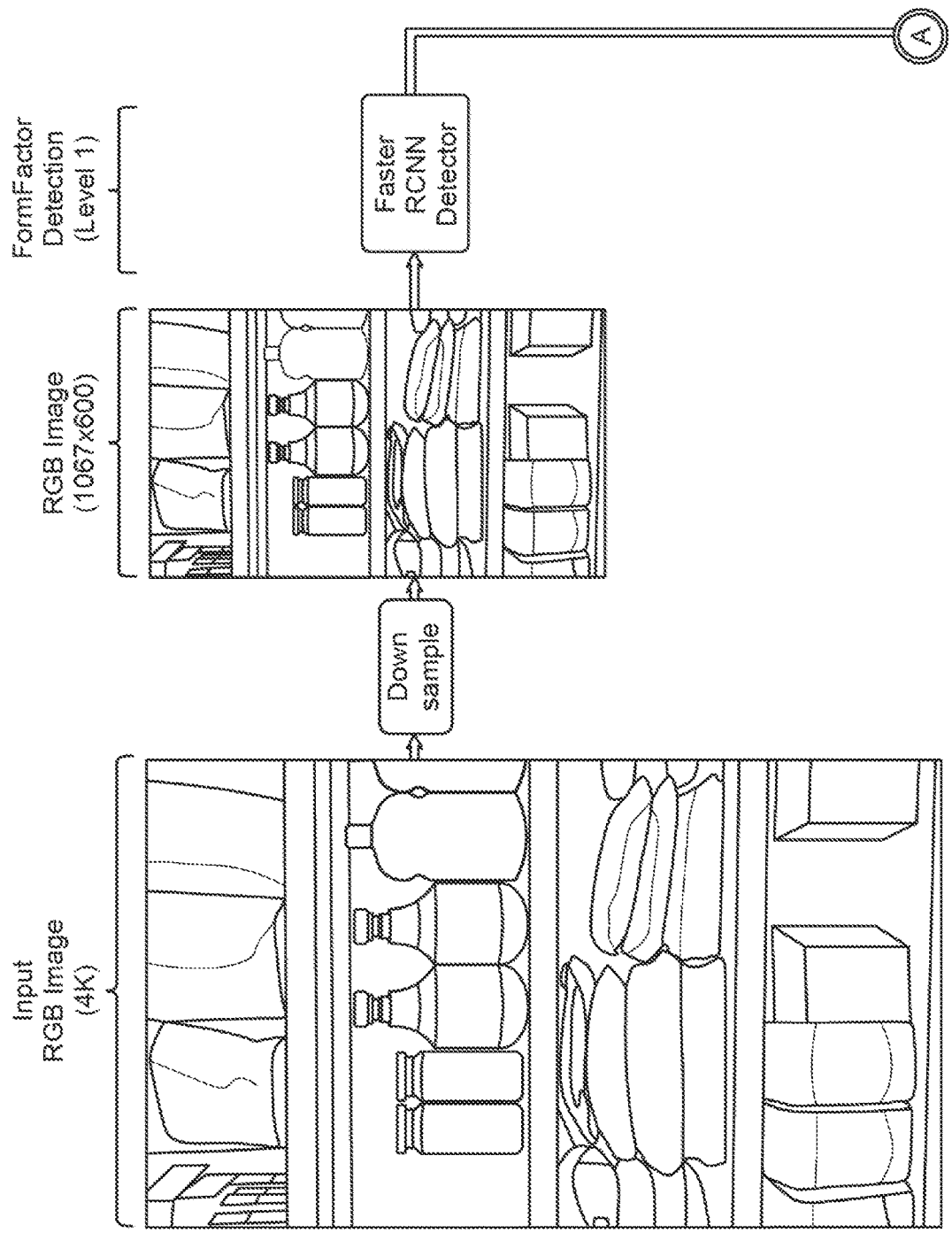
FIGS. 19-20 illustrate the manner in which a planogram is populated in a system of the type disclosed herein.

A particular, non-limiting embodiment of the logical architecture 501 of the foregoing system may be appreciated with respect to FIG. 18. As seen therein, the logical architecture 501 in this particular embodiment includes a flight module 503, a recognition module 505 and a cognition module 507. It will be appreciated that, although these components or functionalities are depicted as distinct modules or elements for purposes of illustration, in some embodiments of the systems and methodologies disclosed herein, these modules or their components or functionalities may be combined in various ways.

The flight module 503 includes various programs, routines, functions, and other resources to enable the drone or other object recognition platform to successfully complete image capture cycles. Thus, for example, the flight module 503 in this embodiment includes full-cycle autonomy (that is, suitable instructions and resources to allow the drone or other object capture platform to perform its job without further input by the user, and possibly without further input by the system), people (and more generally, object) avoidance capabilities, mapping resources, navigation functionality, situational awareness and self-diagnostics.

The recognition module 505 features a faster R-CNN. The faster R-CNN includes a region proposal network for generating region proposals, and a network for using these proposals to detect objects. The recognition module 505 is preferably adapted for incremental training, and preferably has the ability to scale to millions of CPGs.

The cognition module 507 includes RNN predictive learning, business analytics, a web-based user interface (UI) and a hierarchical navigation model.

Figure 6:
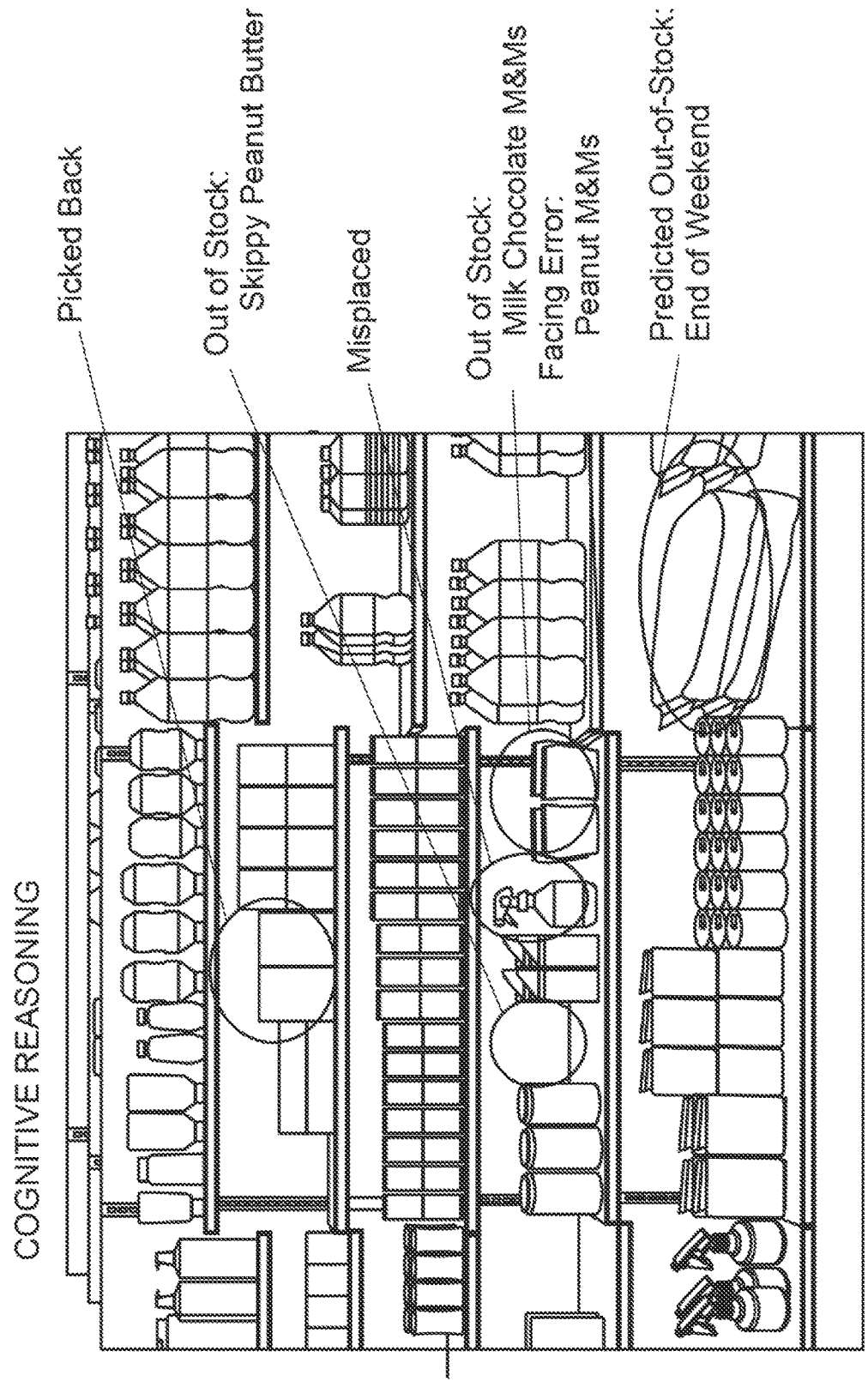
FIG. 6 is an illustration of various present or future states for CPGs that may be factored into the cognitive reasoning of the systems and methodologies disclosed herein.

The cognitive reasoning algorithm implemented by the systems and methodologies described herein may be further appreciated with respect to FIG. 6. As seen therein, the cognitive reasoning applied by preferred embodiments of the systems disclosed herein yields various predictions and conclusions with respect to the state of CPGs. For example, the system is able to identify items which have been picked back (e.g., the pasta), which items are misplaced (e.g., Clorox® bleach), and which items are out of stock (e.g., Skippy® peanut butter).

The system is also preferably adapted to accommodate facing errors. This may be appreciated with respect to FIG. 6. Thus, as seen therein, the system has determined that milk chocolate M&Ms® candies are actually out of stock, even though their allocated space on the shelf is not empty. This is the result of a facing error, in which peanut M&Ms® candies have been misplaced in the area designated for milk chocolate M&Ms® candies (thus resulting in the misleading appearance that the item is actually well stocked).

The system is also able to predict the depletion date for CPGs. Thus, referring again to FIG. 6, although several packages of Kingsford® charcoal are present on the shelf, the system is able to predict, based on past consumption patterns, that this item will nonetheless be out of stock by the end of the weekend.

Figure 7:
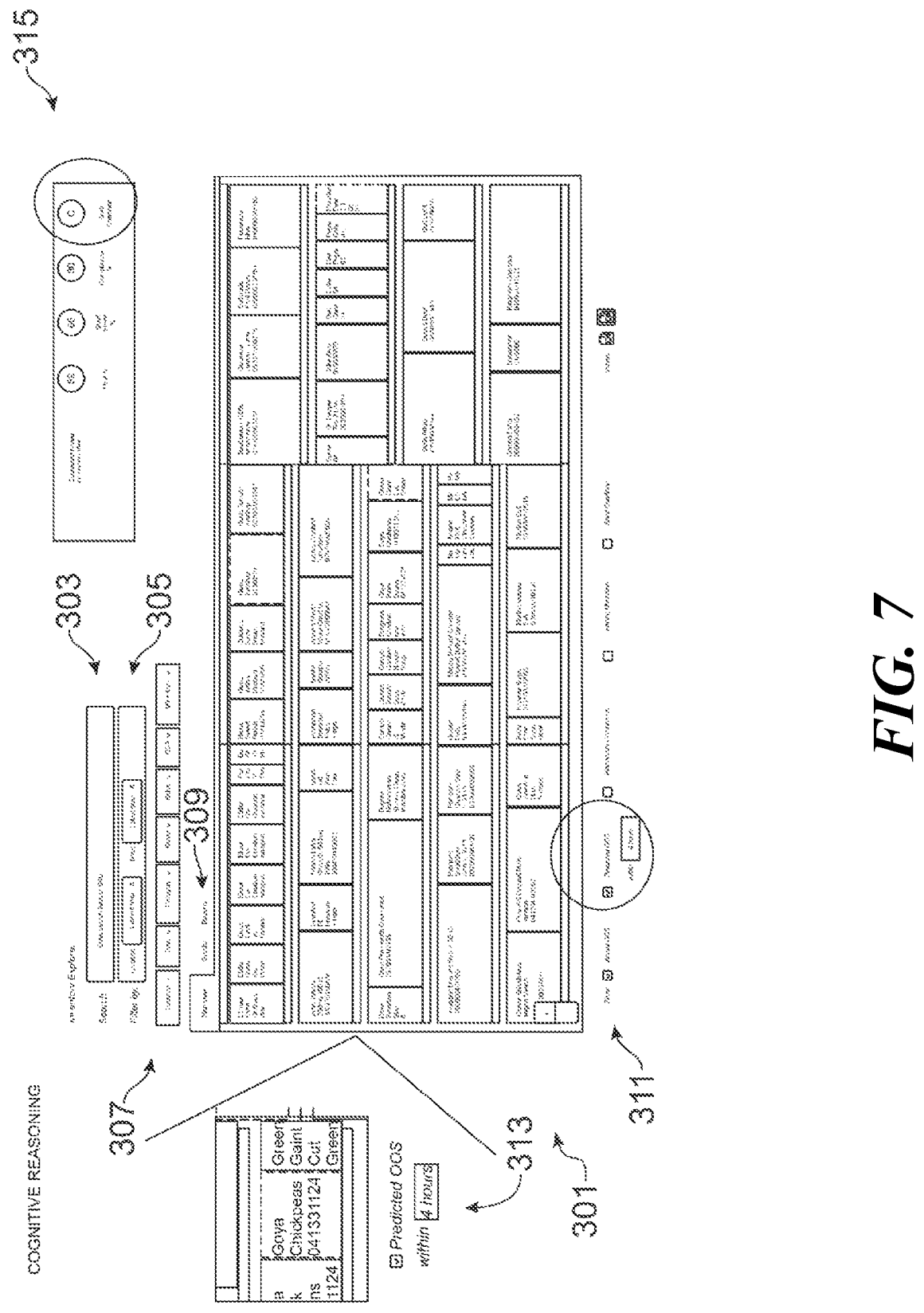
Figure 8:
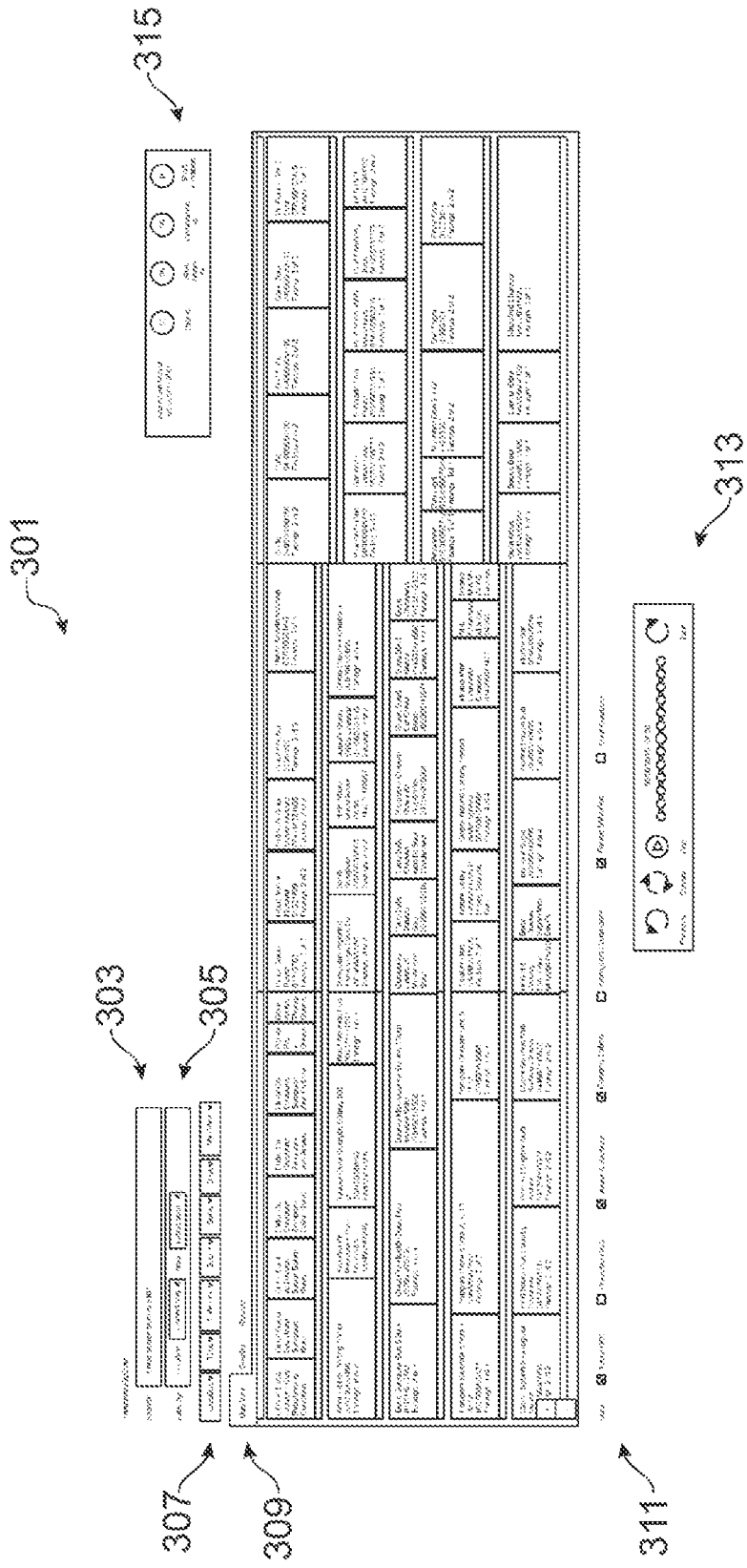
FIGS. 8-9 are screenshots from a software program used in the back-end of a system of the type disclosed herein which illustrates the application of cognitive reasoning, and the use of imputed planograms, in the systems and methodologies disclosed herein.
Figure 9:
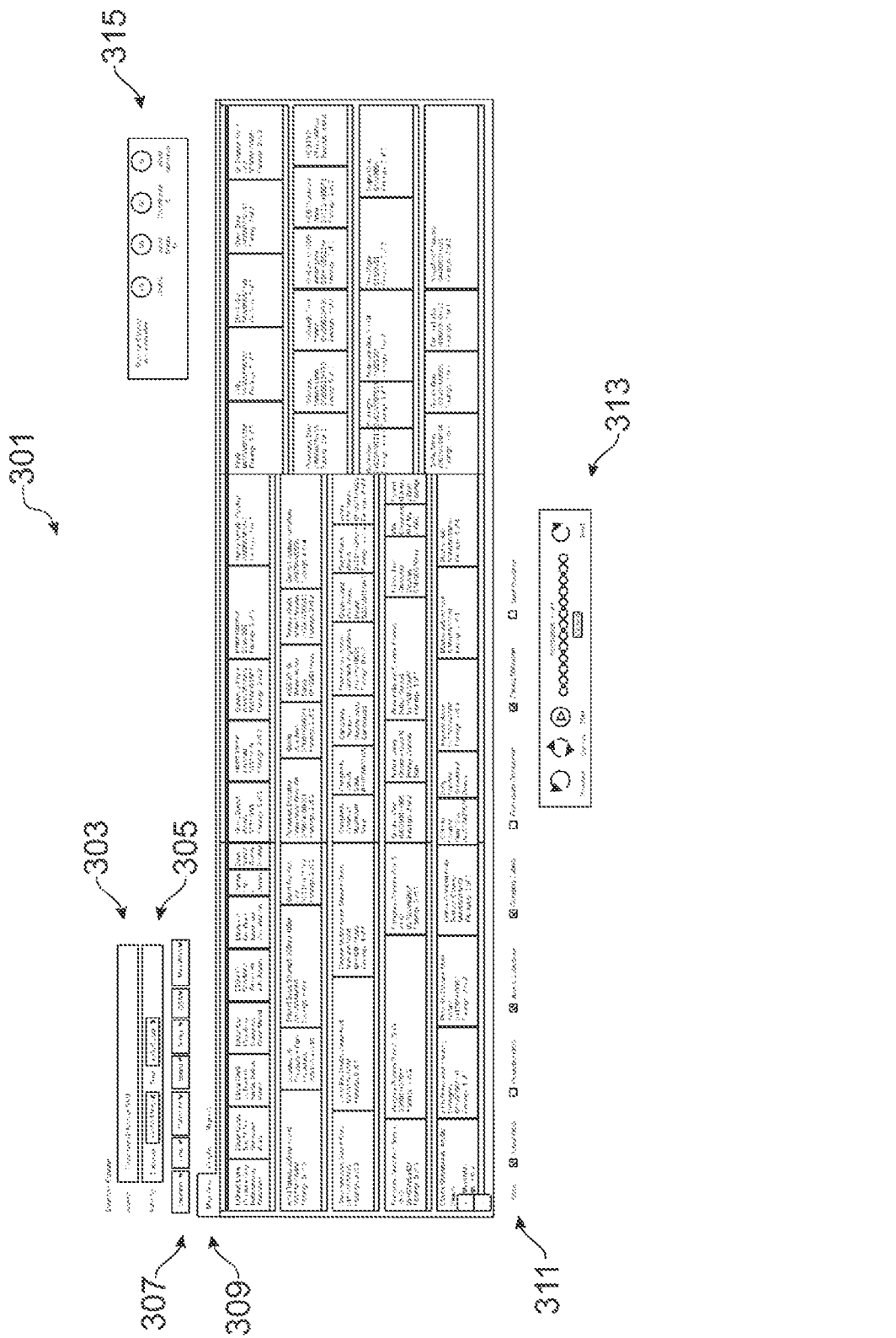

FIGS. 7-9 are screenshots of a particular, non-limiting embodiment of a software program that may be utilized in the backend of the systems described herein. As seen therein, the software in this embodiment provides a useful and user-configurable GUI 301 with various features that allow a user to assess the current status (and future predicted status) of on-shelf inventory. The GUI 301 includes a search engine 303 which may be utilized to query a database of stock items using, for example, suitable descriptors or SKUs. These descriptors or SKUs may be entered, for example, as a Boolean query. A filter 305 is provided to allow the user to filter the search results, preferably by shelf conditions (such as, for example, the current or expected location (or locations) of the item, and the time at which the item was last scanned).

A series of selectable menus 307 is provided which allow the user to display the status of CPGs according to various selected criteria. In the particular embodiment depicted, these include location, time, category, brand, seller, and on-shelf availability (OSA). A further menu is provided which is entitled "My Filters", and which allows the user to define customized display criteria.

Figure 20:
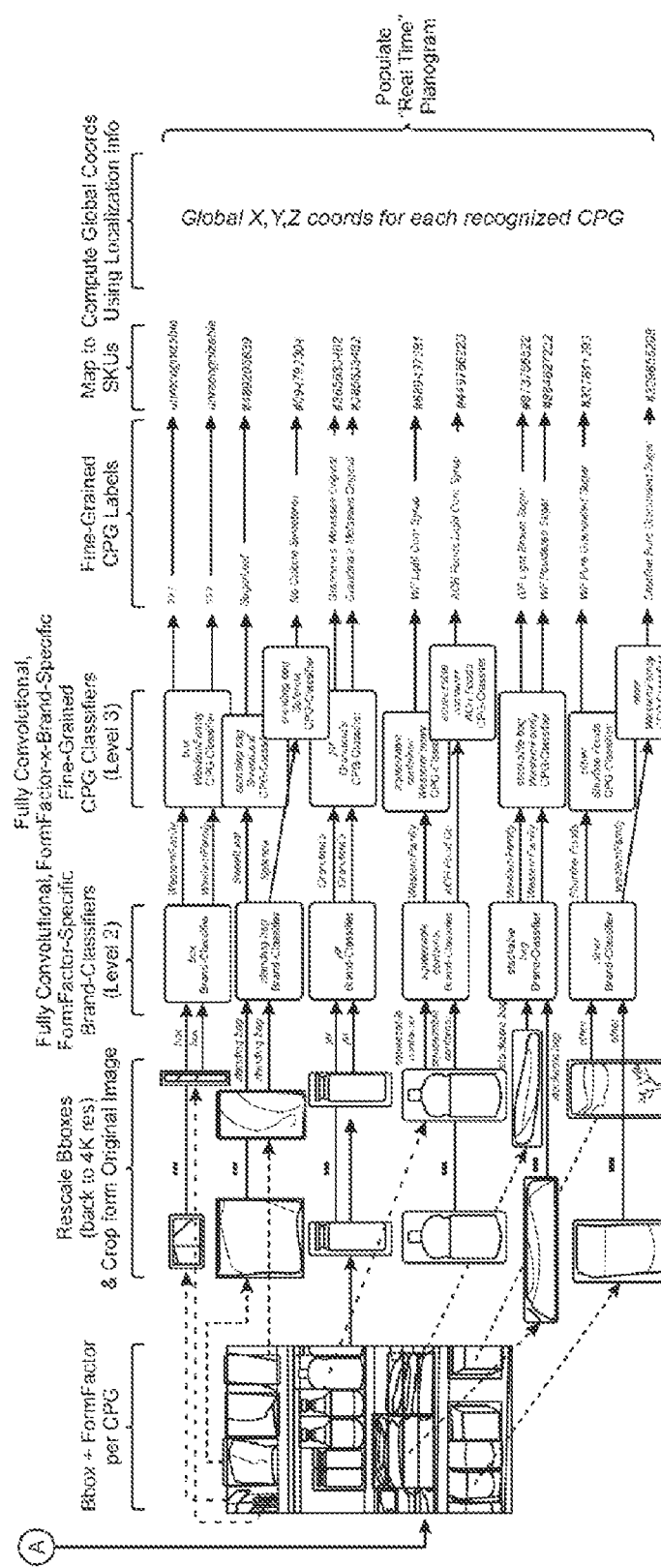

Within each display criteria, a series of tabs 309 is provided which allows the user to further select different views of the results. FIGS. 7-9 depict the "map view", which shows a planogram for the CPG stock. The planogram, which may be populated using, for example, the methodology shown in FIG. 20, depicts the shelf location of the CPGs in the portion of the stock currently on the shelf. A "Graphs" tab is also provided which generates various graphs related to the CPGs (and their current and predicted states). A "Reports" tab is provided which allows the user to see or generate various reports on the CPGs such as, for example, a listing of CPGs sorted by expected depletion date, depletion status or current or predicted restocking rate.

In the particular embodiment depicted in FIGS. 7-9, the GUI also provides a series of selectable options 311 for the data to be depicted. These include options to depict the actual out of stock (OOS) time for each CPG, the predicted OOS for each CPG, a compliance planogram for each CPG, the facing utilization of each CPG, and the shelf condition of each CPG. A user selectable time period 313 is provided which governs each of the selectable options. Thus, for example, in the excerpt at the left of FIG. 7, when the "predicted OOS" option is selected, the software (for the particular data that the screenshot is based on) predicts that Goya chickpeas will be out of stock in 4 hours.

In the particular embodiment depicted in FIGS. 7-9, the GUI 301 further comprises a scorecard 315 which provides a numerical assessment based on whatever filter has been chosen by the user. This scorecard 315 allows the user to quickly ascertain the state of CPG inventory by displaying key metrics, such as the on-shelf availability (OSA) %, shelf share %, compliance % and shelf condition of CPGs.

It will be appreciated that, among other things, the GUI 301 of FIGS. 7-9 represents and displays conclusions about which CPGs have run out, which are about to run out and which are predicted to run out (see dashed lines). Hence, the GUI provides a digitized representation (here, an imputed planogram) of predictions, cognitive conclusions and observations.

The functionality of the GUI 301 reflects two inherent processes or steps. The first is a cognitive conclusion. In particular, by scanning the shelves with a drone and generating a multitude of views thereof in the manner described above, one can obtain a good understanding of the current stock of CPGs, the number of facings presented, and the location of the CPGs. By itself, this step provides only limited information, because it merely provides a current snapshot of the state of the stock. In particular, it provides limited information about what is out of stock, what is misplaced, or even what is misspaced.

However, after multiple iterations of the foregoing step (or with a suitable frame of reference, such as how things appeared at some point in the past), the system is able to infer or impute a reference model or an imputed planogram that indicates what the stock is being managed to. It does so using a recurrent neural network and, in particular, an LSTM variant of an RNN (that is, a variant with Long-Short Term Memory Units). This neural network looks at a large number of sequences of states (preferably, how things change over time), and uses those sequences to predict what the future sequences of states will be (especially, the point of time at which the count of a CPG will hit zero).

The foregoing system works quite well when it begins with an exact count of inventory on a shelf. However, it has been found that several benefits may be obtained by utilizing more granularity in the CPG count. Hence, rather than attempting to ascertain an exact CPG count, preferred embodiments of the systems and methodologies disclosed herein utilize a greater level of granularity. In particular, these systems and methodologies utilize a convolutional neural network, in conjunction with visual processing of CPGs on a shelf, to approximate how full or complete the CPG is on the shelf. Hence, rather than knowing exact CPG counts and how that changes in time (which cannot be known without exact CPG counts), preferred embodiments of the systems and methodologies disclosed herein approximate both parameters, preferably through the use of an appropriate gradation.

Figure 14:
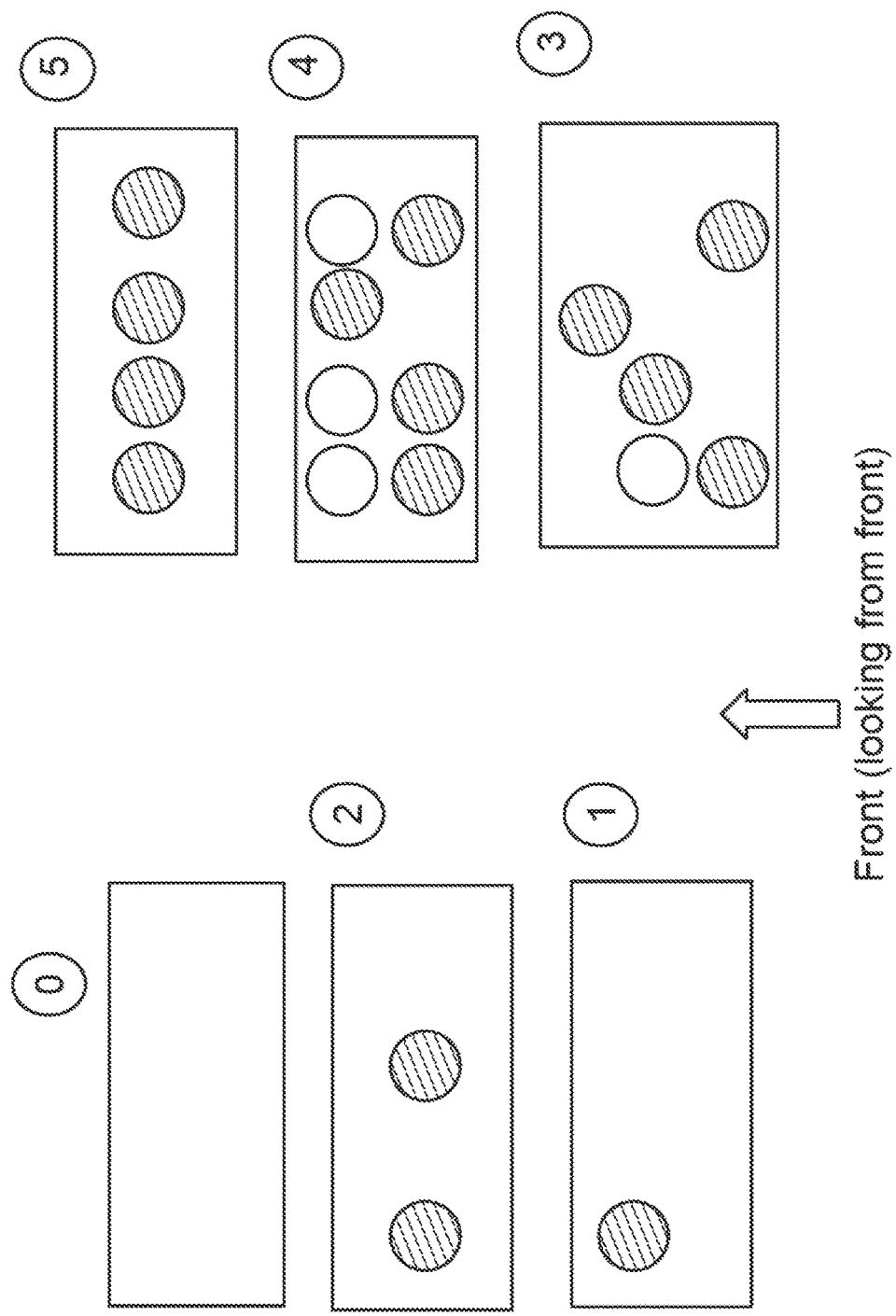
FIGS. 14-16 illustrate an embodiment of a system disclosed herein for implementing a scoring algorithm for CPG shelf depletion.
Figure 15:
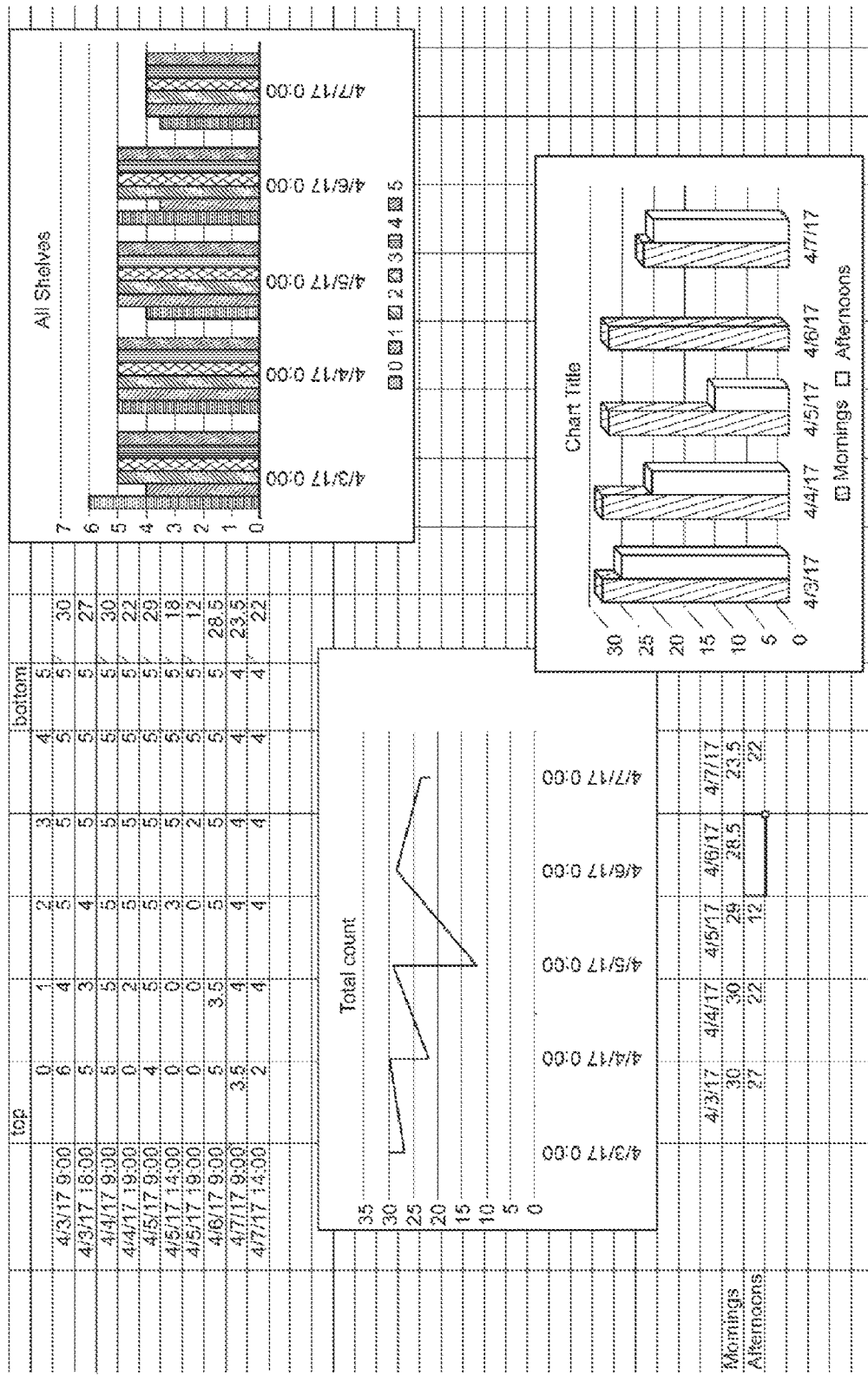
Figure 16:
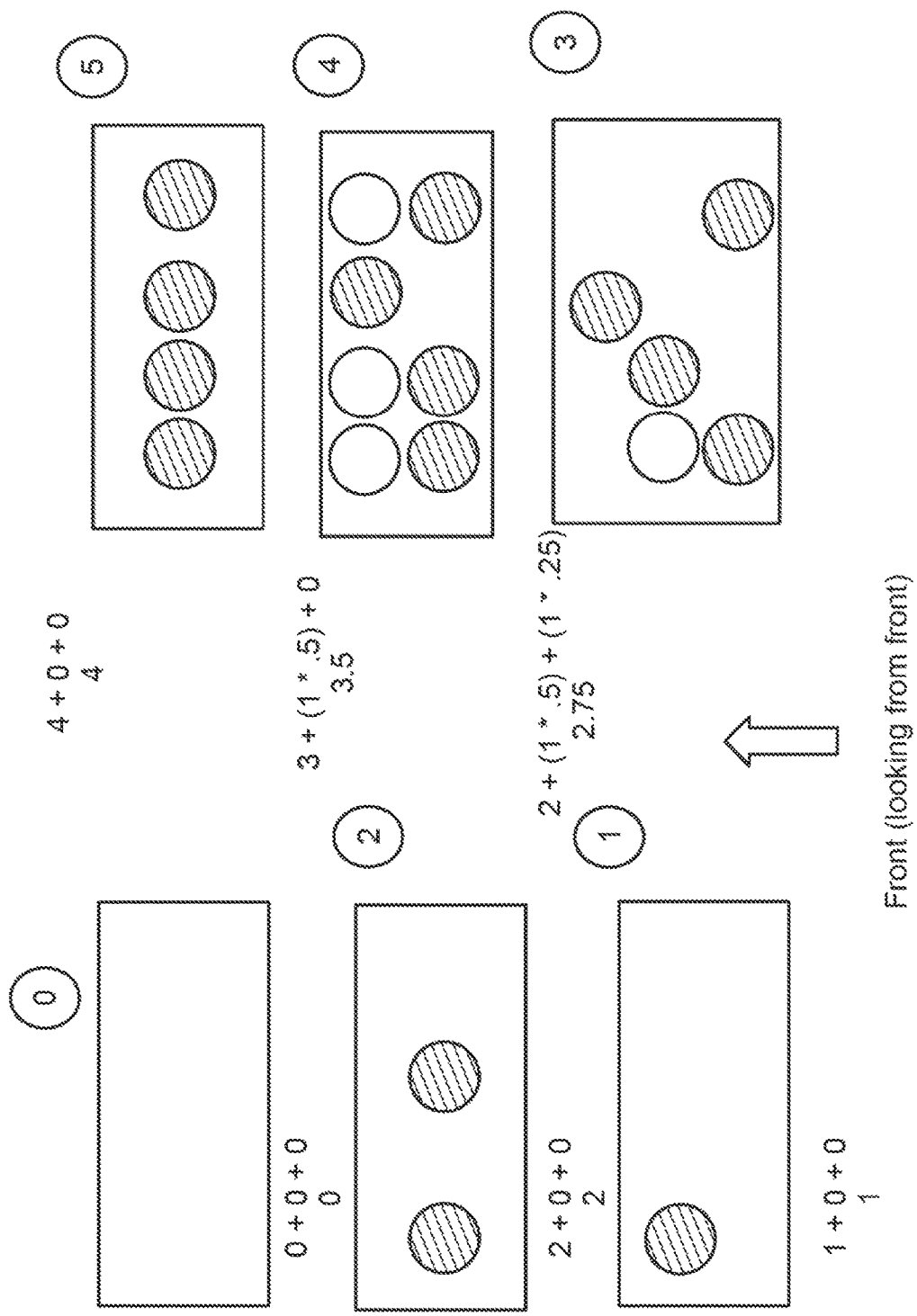

For example, some embodiments of these systems and methodologies may utilize a quarter gradation, whereby the system determines that the CPG count falls into one of five categories: empty, ¼ full, ½ full, ¾ full, or full. This process may be understood with reference to FIG. 16, which depicts this gradation process being applied to the shelving units shown in FIG. 14 (the associated portion of the GUI, which graphically depicts this information as a function of time, is shown in FIG. 15). These systems and methodologies then utilize a convolutional neural network, in conjunction with visual processing of CPGs on the shelf, to predict when a particular CPG will be fully depleted.

The GUI 301 of FIGS. 7-9 also includes a video function accessible through video icons 321. This video function is illustrated in FIGS. 8-9 (for a different planogram). As seen therein, the video is essentially a time lapse of the planogram in which each frame of the video is a time increment that may be set by the user. Thus, FIG. 8 shows the planogram approximately half-way through the duration of the video, and FIG. 9 shows the planogram at the end of the video. The time lapse reflected in the video allows a user to visually understand the depletion of stock over a given time interval, and in particular, allows the user to appreciate the relative depletion of stock, and the rate of depletion for particular CPGs, as a function of time. Preferably, the CPGs in the planogram are depicted with suitable color coding to allow the user to readily discern the current state of individual CPGs, and to readily identify those that are approaching (or have reached) a state of 100% depletion. By way of example but not limitation, green shading may be utilized for CPGs that are fully (or almost fully) stocked, yellow shading may be utilized for CPGs that have been partially depleted, and red shading may be used for CPGs that have been depleted (or are nearing depletion).

Figure 10:
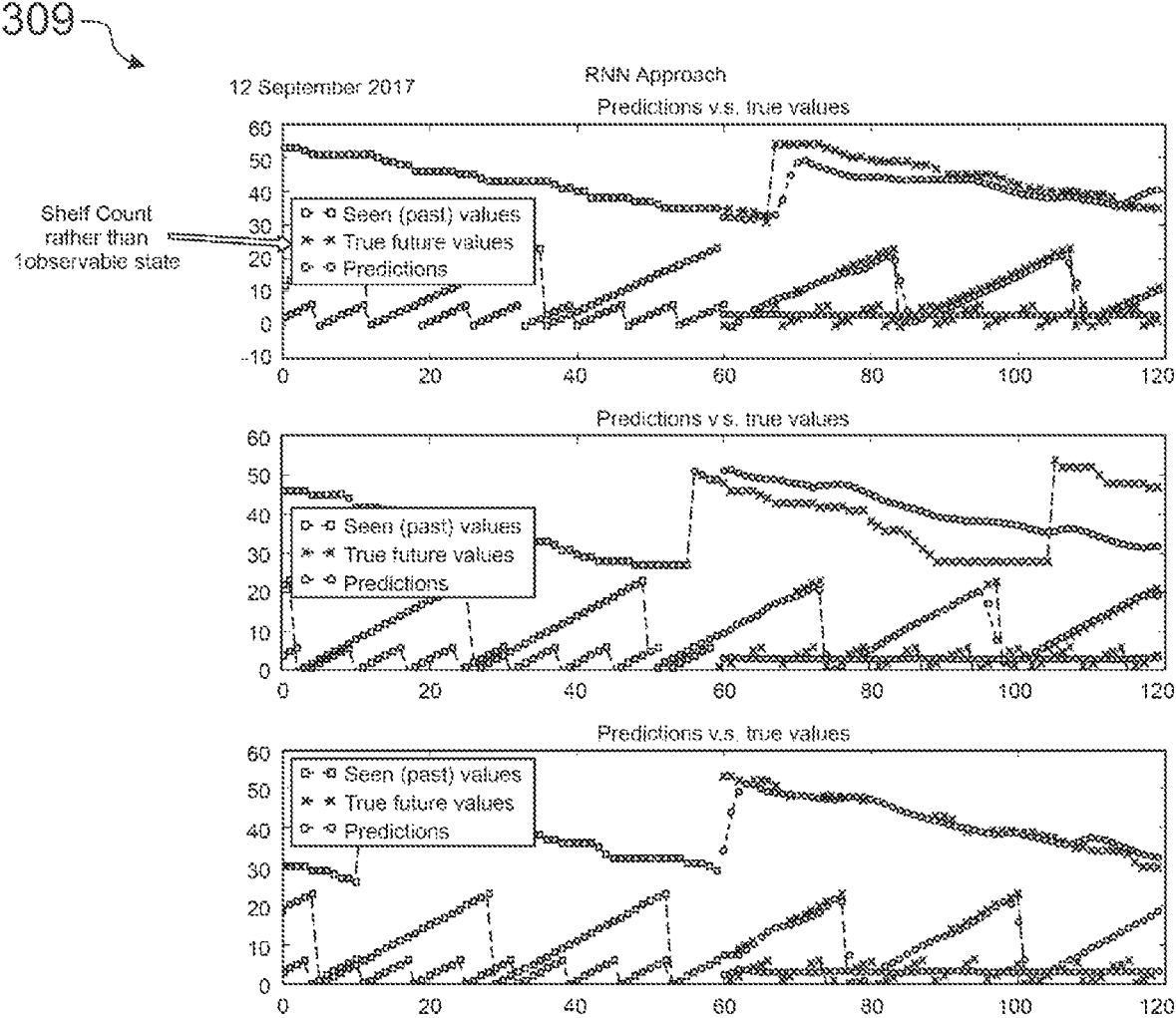
FIG. 10 is a series of graphs of predictions versus true values for CPG states.

FIG. 10 depicts a particular, non-limiting example of the graphs which are accessible via the "Graph" selection in the tabs 309 of the GUI 301. The graphs depicted show past values of stock levels for CPGs, true future values for the stock levels (that is, values determined through shelf count rather than observable states), and predicted values for the stock levels from some future point in time.

Figure 11:
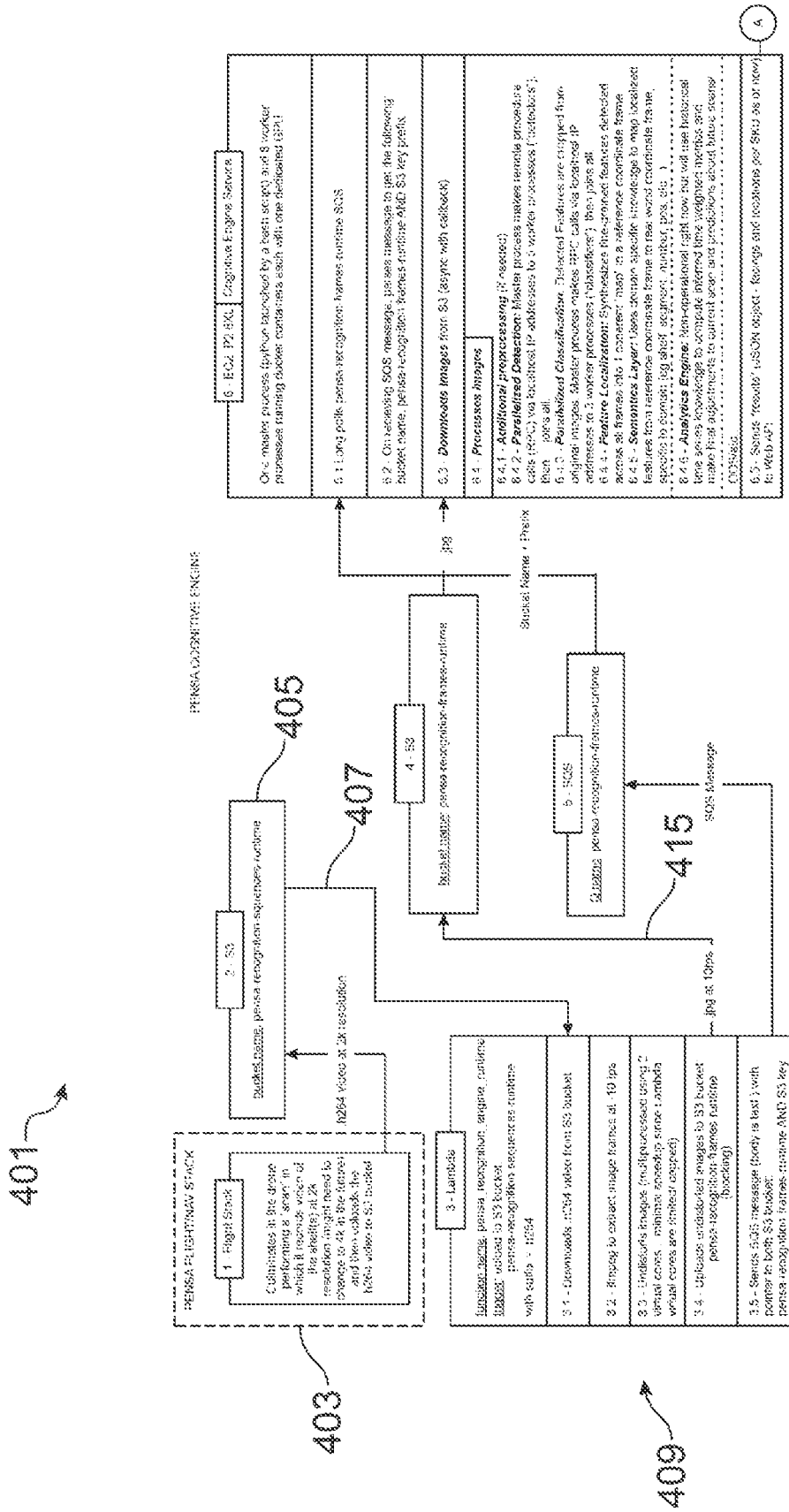
FIGS. 11-12 are flowcharts depicting the logic flow in the cognitive engine in a preferred embodiment of a back-end portion of a system disclosed herein.
Figure 12:
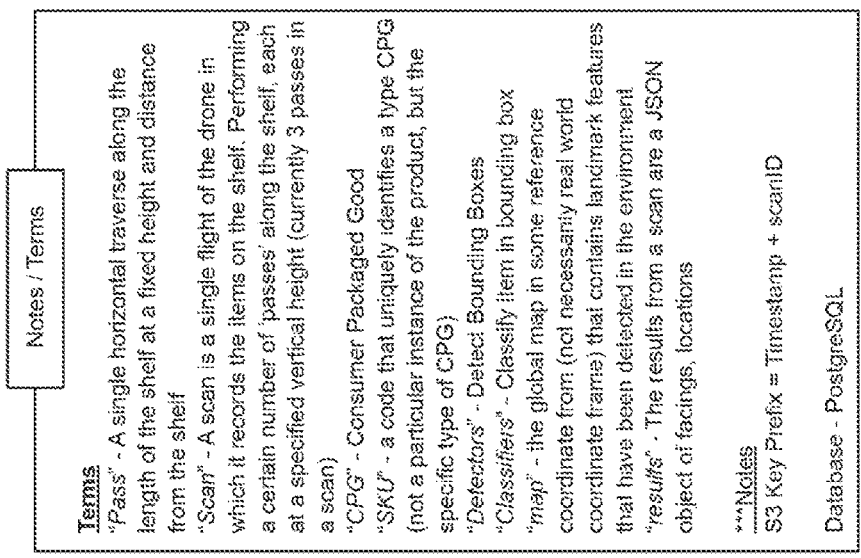
Figure 12:
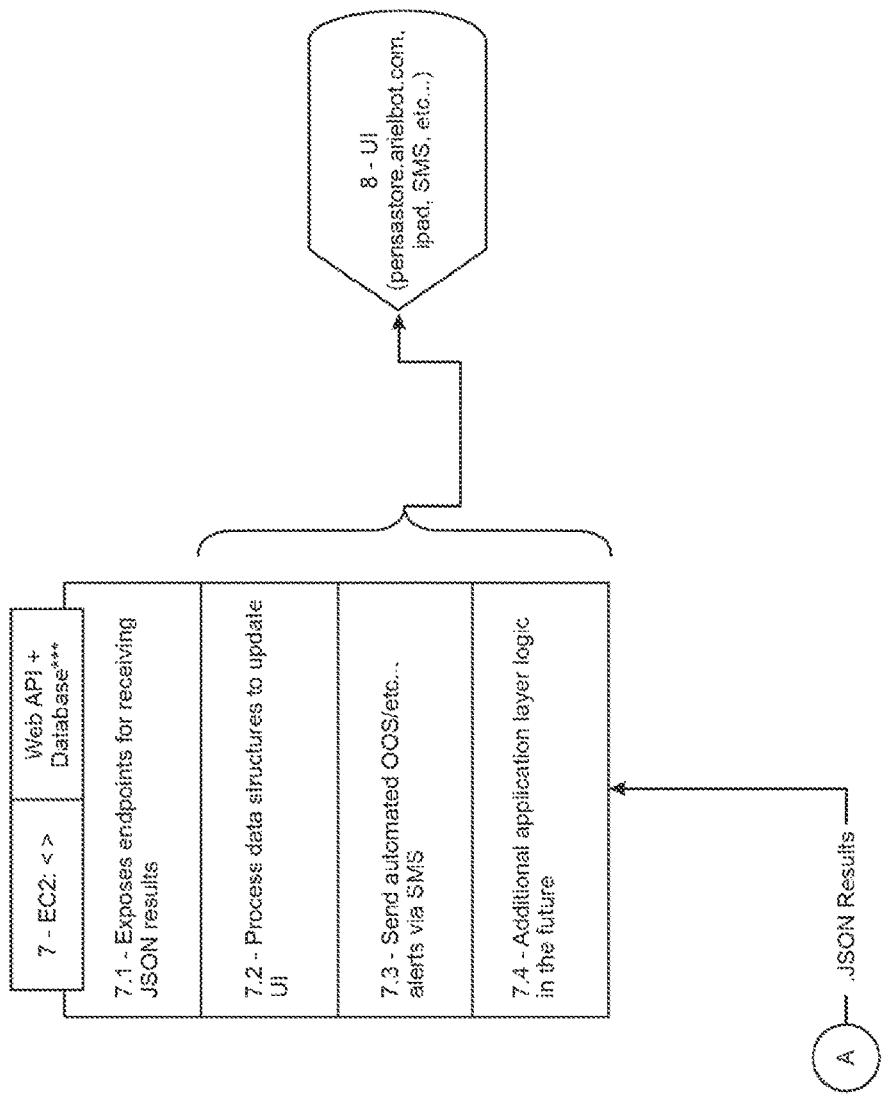

FIGS. 11-12 are sections of a flow chart depicting the data flow through a particular, non-limiting embodiment of a cognitive engine that may be utilized in the systems and methodologies described herein. The overall process being implemented here has been described above. However, the flow chart provides additional programming details.

With respect to FIG. 11, the cognitive engine 401 features a flight/navigational stack 403 which is in communication with one or more cameras. The flight/navigational stack 403 forms part of the front end of the system, as previously noted.

In operation, a suitable platform (e.g., a hovercraft) equipped with the flight/navigational stack 403 is dispatched at a point in time and captures input (preferably image and/or video input). The input is captured in such a way that it is localized, such that the system knows where the camera was pointed and what it was looking at when the input was captured. In the particular embodiment depicted, the input is video captured at 2k resolution, although one skilled in the art will appreciate that any suitable resolution (for example, 4 k or 5 k or, in some embodiments, lower resolutions) may also be utilized. The captured .h264 video is then uploaded to a bucket 405.

The captured .h264 video is then downloaded 407 from the bucket by a lambda package 409, which uses ffmpeg to extract image frames 411 (preferably at about 10 fps). The resulting images are then processed 413 to remove any distortions therein. This may occur, for example, by leveraging multiple processing cores. The resulting distortion-free images are then uploaded 415 to the bucket at a suitable frame rate (for example, 10 fps).

An SQS (simple queue service) message is then sent 417 by the lambda package 409 to a cognitive engine service 421. The message includes a textual body and a pointer to the bucket in which the distortion-free images are stored, and further contains a key prefix. The cognitive engine service 421 in an illustrative embodiment includes a master process (in Python and launched by a bash script) and 8 worker processes. Each worker process runs Docker containers with one dedicated GPU.

The cognitive engine service 421 uses a long polling mechanism 423 for SQS message consumption from the message queue. Upon receiving an SQS message, the cognitive engine service 421 parses the message 425 to obtain a bucket name and key prefix, and downloads 427 the corresponding images from the bucket. The cognitive engine service 421 then processes the downloaded images using a semantics layer 431 and an analytics engine 433 to perform parallel detection 435, parallelized classification 437 and feature localization 439, and sends the results 441 (preferably in the form of a JSON object which may include, for example, facings and locations per SKU) to a web API and database 451.

The semantics layer 431 uses domain-specific knowledge to map localized features from a reference coordinate frame to a real-world coordinate frame that is specific to a domain (for example, a shelf segment number or position). The analytics engine 433 uses historic time series knowledge to compute inferred time weighted metrics and to make final adjustments to the current scan and predictions about future scans.

The parallel detection process 435 is a master process which makes remote procedure calls (RPCs) via local IP addresses to multiple worker processes (sometimes referred to as "detectors"), and then joins all of the worker processes. The parallelized classification process 437 crops detected features from the original images, after which the parallel detection process 435 makes RPC calls via local host IP addresses to worker processes (sometimes referred to as "classifiers"), and then joins all of those processes. The feature localization process 439 synthesizes fine-grained features detected across all frames into a single coherent map in a reference coordinate frame.

Figure 21:
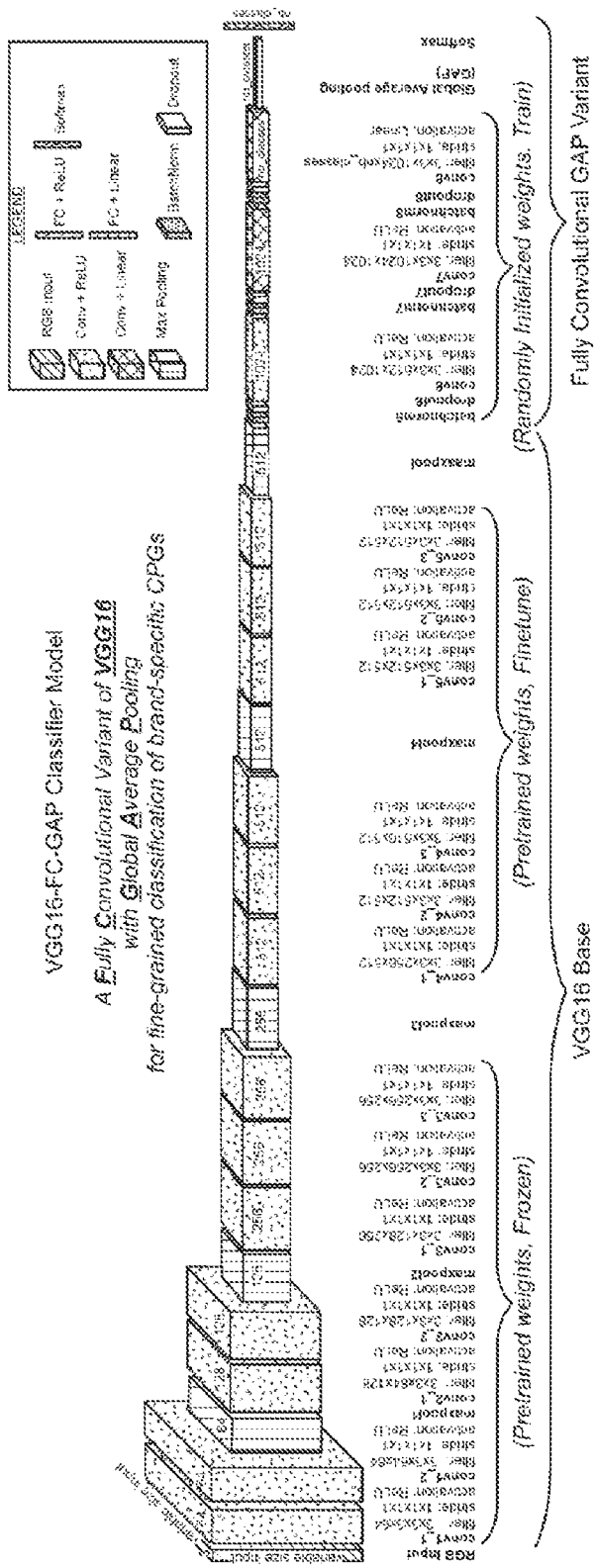
FIG. 21 illustrates a classifier model which may be utilized in the systems and methodologies disclosed herein.

Various types of classifiers may be implemented by the foregoing worker processes that are called by the parallel detection process 435. FIG. 21 depicts a particular, non-limiting embodiment of such a classifier. The classifier 801 depicted therein is a fully convolutional variant of VGG16 with global average pooling (VGG16-FC-GAP) classifier model which provides for fine-grained classification of brand-specific CPGs. As seen therein, this classifier includes a variable size RGB input 803, and features convolutional (Cony) layers 805, Batch Normalization (BatchNorm) functions 807, Dropout functions 809, Softmax functions 811, Fully Connected (FC) layers 813, ReLU (Rectified Linear Units) layers 815, and Max Pooling layers 817.

The Cony layers 805 extract features from the input image (convolution preserves the spatial relationship between pixels by learning image features using small squares of input data). The BatchNorm functions 807 perform a technique to provide any layer in a Neural Network with inputs that are zero mean/unit variance. The Dropout function 809 is a regularization technique for reducing overfitting in neural networks by preventing complex co-adaptations on training data. The Softmax function 811 is a function that takes as input a vector of K real numbers, and normalizes it into a probability distribution consisting of K probabilities that are proportional to the exponentials of the input numbers (after applying the softmax function, each component will be in the interval (0,1), and the components will add up to 1, thus allowing them to be interpreted as probabilities). The FC layers 813 are used to detect specific global configurations of the features detected by lower layers in the neural network. The ReLU layers 815 apply the function f(x)=max (0, x) to all of the values in the input volume, which has the effect of changing all the negative activations to 0 (this layer serves to increase the nonlinear properties of the model and the overall network without affecting the receptive fields of the cony layer). The Max Pooling layer basically takes a filter (normally of size 2×2) and a stride of the same length, applies it to the input volume, and outputs the maximum number in every subregion that the filter convolves around (the stride controls how the filter convolves around the input volume).

Referring again top FIG. 11, in operation, the cognitive engine service 421 operates by transmitting the information it receives to a convolutional neural net model which is preferably running in the cloud. The convolutional neural net model determines what is on every shelf position, and where the shelf is overall in a map of the facility (this map may be developed as part of the overall process described herein). The convolutional neural net model may also perform other processing to reach other cognitive conclusions.

These results may be fed into other neural net models (such as, for example, a recurrent neural net model) to draw other conclusions, and to update one or more databases. Such databases preferably include a time series database of the shelf which may record, for example, what the camera sees on the front end, and any anomalies that are detected and represented. An iterative process may then be utilized to respond incrementally to items that were not recognized, and to incrementally update the training.

After receipt of the JSON results 441, the web API and database 451 exposes endpoints 453 for receiving the JSON results 441, and processes 455 all data structures as necessary to update the UI 461. The web API and database 451 may also send automated out-of-specification (OOS) alerts when appropriate via SMS (short message service) or other suitable means. Various other application layer logic may be included in embodiments of the web API and database 451.

Figure 13:
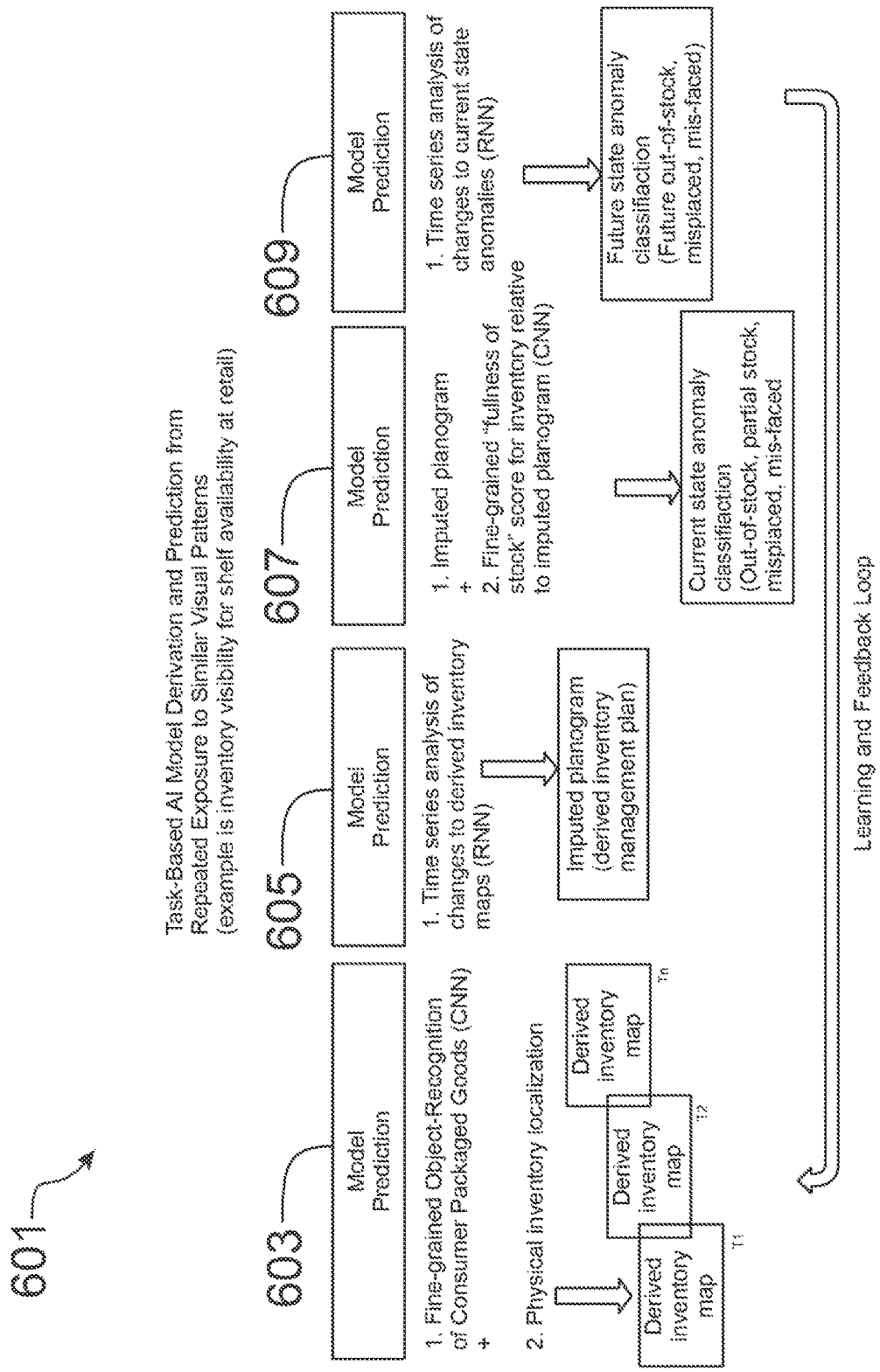
FIG. 13 is an illustration of an embodiment of a process disclosed herein for task based artificial intelligence model derivation and prediction based on repeated exposure to similar visual patterns.

FIG. 13 illustrates a particular, non-limiting embodiment of a process 601 which illustrates how preferred embodiments of the systems and methodologies described herein perform task-based AI model derivations and make predictions based on repeated exposure to similar visual patterns.

In the first model prediction portion 603 (represented in the first column) of the process, visual patterns (images of CPGs) are captured by the front end of the system. When the system captures these images, it uses fine-grained object recognition of CPGs, preferably obtained from up to 100 different angles, to develop a derived inventory map (that is, a derived view of what is currently on the shelf). This information is then stored in time sequence in a database.

In the second model prediction portion 605 of the process (represented in the second column), the system performs time series analysis of changes to the derived inventory maps using a recurrent neural network (RNN). From this analysis, the system derives an imputed planogram (or derived inventory management plan). In essence, this involves looking at how the derived inventory map appeared at different points in time, and inferring from this information one or more future states of what the inventory is currently being managed to.

The third model prediction portion 607 of the process (represented in the third column) inputs the imputed planogram and what it is being managed to. It also inputs a model (a different convolutional neural net model) for looking at the fullness (e.g., the state of depletion) of a CPG (in other words, for each SKU in the current state, does the SKU appear to be half full, half empty, three quarters full, or completely full). The system then uses this information to detect and reach current state conclusions about cognitive anomalies. Such anomalies may include, for example, one or more items being completely or partially out of stock in the current state, being misplaced (according to the imputed planogram), or being in an improper formation (for example, 6-wide instead of 4-wide).

The fourth model prediction portion 609 of the process (represented in the fourth column) undertakes a time series analysis of changes to the current state anomalies using a recurrent neural network (RNN), and uses that analysis to predict future state anomalies. In essence, this part of the process uses the time series analysis to predict future state anomalies, based on all the current state anomalies over time and how they changed (e.g., what will be out of stock in the future, what will be misplaced or misspaced, or in other conditions requiring rectification).

The system then uses a learning and feedback loop to feed what was learned into a further iteration of the process. This process continuous indefinitely, with the system capturing more images at different times, building new models of what is there, and tuning the reference planogram. As a result, the system achieves better performance over time at making predictions.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A system for managing consumer packaged goods (CPGs), comprising:
   a front end which includes a mobile, airborne platform equipped with
   (a) a digital image capturing device, and
   (b) a wireless communications device; and
   a backend, in communication with said front end via said wireless communications device, said back end including
   (a) a combinational convolutional neural network which derives models based on input data,
   (b) a convolutional neural network which generates perception scoring utilizing input put from said combinational convolutional neural network, and
   (c) a recurrent neural network which makes behavior predictions based on input from said convolutional neural network;
   wherein said front end captures images of CPGs on a shelf, wherein the CPGs are subject to depletion over time, and wherein the backend generates predictions regarding the depletion state of the CPGs on the shelf as a function of time.

2. The system of claim 1, wherein the behavior predictions generated by the recurrent neural network include the state of CPGs on a shelf as a function of time.

3. The system of claim 2, wherein said backend further includes a state machine which ascertains the actual state of CPGs on a shelf at a given time, and wherein said recurrent neural network compares the predicted state of CPGs to the actual state of the CPGs and inputs the results to the combinational convolutional neural network.

4. The system of claim 1, further comprising:
   a graphical user interface (GUI) which includes a dashboard that displays the status of CPG items on a shelf at a physical store.

5. The system of claim 4, wherein the dashboard displays CPGs that have run out.

6. The system of claim 4, wherein the dashboard displays CPGs that have partially run out.

7. The system of claim 4, wherein the dashboard displays the time at which each CPG in a set of CPGs is predicted to run out.

8. The system of claim 7, wherein the time at which each CPG in a set of CPGs is predicted to run out is generated by said recurrent neural network based on input from said convolutional neural network.

9. The system of claim 1, wherein said recurrent neural network generates imputed planograms which predict a future depletion state that each of the CPGs is being managed to.

10. The system of claim 1, wherein the convolutional neural network develops derived inventory maps of the CPGs on the shelf.

11. The system of claim 10, further comprising:
a time series database, wherein said database includes arrays of derived inventory maps indexed by time.

12. The system of claim 11, wherein the recurrent neural network operates on said time series database to generate imputed planograms which predict the depletion state that the CPGs are currently being managed to.

13. The system of claim 12, wherein each CPG has a stock keeping unit (SKU) associated with it, and further comprising:
a convolutional neural network model which specifies the fullness state of each SKU, wherein the fullness state is a ratio having a numerator and a denominator, wherein the denominator is the number of CPGs associated with a particular SKU that are present on the shelf when the shelf is fully stocked, and wherein the numerator is the number of CPGs associated with the particular SKU that are currently on the shelf.

14. The system of claim 13, further comprising a set of current state conclusions about current state cognitive anomalies.

15. The system of claim 14, wherein said cognitive anomalies are selected from the group of conditions consisting of (a) an item being out of stock, (b) an item being misplaced, or (c) the width of a row of CPGs is different than the width in the imputed planogram.

16. The system of claim 15, further comprising:
a time series analysis module which conducts a time series analysis on the current state cognitive anomalies to predict future state anomalies.

17. The system of claim 12, wherein each CPG has a stock keeping unit (SKU) associated with it, and further comprising:
a convolutional neural network model which specifies the velocity of change for CPGs associated with each SKU.

18. The system of claim 17, wherein the convolutional neural network uses the convolutional neural network model to predict the future state of CPGs associated with each SKU.

19. In combination with the system of claim 1, a plurality of shelving units having said CPGs disposed thereon.

20. The combination of claim 19, wherein said plurality of shelving units are disposed in an establishment selected from the group consisting of brick-and-mortar retailer establishments and ecommerce fulfillment centers.

21. In combination with a retail outlet having a plurality of shelving units having consumer packaged goods (CPGs) disposed thereon, a system for managing CPGs on the shelving units, comprising:
a front end which includes a hovercraft equipped with
(a) a flight control stack which controls the operation of the hovercraft,
(b) location awareness functionalities,
(c) multi-sensory perception,
(d) a base station which communicates with said hovercraft through a suitable wireless protocol and which provides data compression functionalities for the data captured by the hovercraft, enables data compression for the captured data, and provides down-sampling, image correction, and in-store geolocation,
(d) a digital image capturing device, and
(e) a wireless communications device; and
a backend, in communication with said front end via said wireless communications device, said back end including
(f) a combinational convolutional neural network which derives models based on input data,
(g) a convolutional neural network which generates perception scoring utilizing input put from said combinational convolutional neural network,
(h) a recurrent neural network which makes behavior predictions based on input from said convolutional neural network,
(i) cloud compute resources selected from the group consisting of resources for pattern recognition, product localization, and predictive learning, and
(j) operational coordination which specify how different coordinate systems selected from the group consisting of vehicle, camera, and image coordinates are manipulated to map them to real-world or shelf coordinates for product localization;
wherein said front end captures images of said CPGs, wherein the CPGs are subject to depletion over time, and wherein the backend generates predictions regarding the depletion state of the CPGs on the shelf as a function of time.

* * * * *